(12) United States Patent
Fujinaga et al.

(10) Patent No.: US 11,556,300 B2
(45) Date of Patent: Jan. 17, 2023

(54) REMOTE DISPLAY DEVICE, REMOTE DISPLAY SYSTEM, AND REMOTE DISPLAY METHOD

(71) Applicant: Furuno Electric Co., Ltd., Nishinomiya (JP)

(72) Inventors: Munekazu Fujinaga, Nishinomiya (JP); Kentaroh Hamamoto, Nishinomiya (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 315 days.

(21) Appl. No.: 16/790,931

(22) Filed: Feb. 14, 2020

(65) Prior Publication Data

US 2020/0183636 A1  Jun. 11, 2020

Related U.S. Application Data

(63) Continuation-in-part of application No. PCT/JP2018/028530, filed on Jul. 31, 2018.

(30) Foreign Application Priority Data

Aug. 18, 2017 (JP) .............................. JP2017-158062

(51) Int. Cl.
*G06F 3/14* (2006.01)
*G01C 21/22* (2006.01)

(52) U.S. Cl.
CPC .......... *G06F 3/1454* (2013.01); *G01C 21/22* (2013.01)

(58) Field of Classification Search
None
See application file for complete search history.

(56) References Cited

U.S. PATENT DOCUMENTS

| 6,313,853 B1* | 11/2001 | Lamontagne ........... G06F 9/451 715/863 |
| 9,292,621 B1* | 3/2016 | Roth ....................... G06F 3/023 |
| 2009/0135202 A1* | 5/2009 | Keuenhof ............ G06F 3/1446 382/128 |
| 2010/0083136 A1* | 4/2010 | Komine .................... G06F 9/52 715/255 |
| 2012/0151386 A1* | 6/2012 | Sun ......................... G06F 3/016 715/810 |
| 2013/0050267 A1 | 2/2013 | Miyamoto et al. |

(Continued)

FOREIGN PATENT DOCUMENTS

| JP | H09198227 A | 7/1997 |
| JP | 2001157284 A | 6/2001 |

(Continued)

*Primary Examiner* — Toan H Vu
(74) *Attorney, Agent, or Firm* — Alleman Hall Creasman & Tuttle LLP

(57) ABSTRACT

A remote display device includes processing circuitry. The processing circuitry display a display screen. The processing circuitry generate a plurality of display data corresponding to mutually different display areas, each being a part of the display screen. The processing circuitry transmit the plurality of display data generated to a plurality of terminal devices, respectively. The processing circuitry update the display screen based on operation data indicative of an operation performed by the terminal device to the display area corresponding to the display data.

19 Claims, 30 Drawing Sheets

(56) References Cited

U.S. PATENT DOCUMENTS

| | | | |
|---|---|---|---|
| 2013/0219295 A1* | 8/2013 | Feldman | G06Q 10/101 |
| | | | 715/781 |
| 2013/0262551 A1 | 10/2013 | Hasuike et al. | |
| 2014/0009366 A1* | 1/2014 | Chang | G09G 3/2092 |
| | | | 345/1.1 |
| 2015/0355715 A1* | 12/2015 | Smith | H04N 21/42222 |
| | | | 715/863 |
| 2016/0224300 A1* | 8/2016 | Kwon | G06F 16/583 |
| 2021/0356854 A1* | 11/2021 | Anderson | G03B 21/62 |

FOREIGN PATENT DOCUMENTS

| | | |
|---|---|---|
| JP | 2013210912 A | 10/2013 |
| WO | 2013030892 A1 | 3/2013 |

\* cited by examiner

REMOTE DISPLAY DEVICE, REMOTE DISPLAY SYSTEM, AND REMOTE DISPLAY METHOD

CROSS-REFERENCE TO RELATED APPLICATION(S)

This application is a continuation-in-part of PCT International Application No. PCT/JP2018/28530, which was filed on Jul. 31, 2018, which claims priority to Japanese Patent Application No. 2017-158062, which was filed on Aug. 18, 2017, the entire disclosure of each of which is hereby incorporated by reference.

TECHNICAL FIELD

The present disclosure relates to a remote display device which remotely displays a display content at a terminal device with a small display area, a remote display system provided with the remote display device and the terminal device, and a remote display method used for the remote display device.

BACKGROUND

A control system including a controlled apparatus provided with a display module, such as a television, and a remote controller which remotely controls the controlled apparatus is disclosed. In this system, the display module to which a touch panel, such as a display integrated tablet, is attached to the remote controller is provided, and the same screen as the screen displayed on the controlled apparatus is displayed on the display module. Note that, when a user touches the touch panel of the remote controller, the touched coordinates are transmitted to the controlled apparatus, and the controlled apparatus processes this coordinates as if the coordinates is selected in the display screen of the controlled apparatus.

For example, a plurality of persons may work jointly, such as a plurality of sailors create a voyage plan, or a plurality of participants (children, students, etc.) receive a lesson. In such a case, it is desired that the display module of the controlled system is used for the joint project to allow the plurality of persons to operate the display module, and such an environment to utilize the display module for the joint project has been increasingly prepared because of the recent large-sized display modules. However, the disclosed system does not have the function required for such a joint project.

SUMMARY

The present disclosure is made in view of the above situation, and one purpose thereof is to provide a remote display device, a remote display system, and a remote display method, which can solve the problem.

In order to solve the problem described above, according to one aspect of the present disclosure, a remote display device includes processing circuitry; i.e. a display module, a display data generator, a wireless communicator, and an updater. The display module displays a display screen. The display data generator generates a plurality of display data corresponding to mutually different display areas, each being a part of the display screen. The wireless communicator transmits the plurality of display data generated by the display data generator to a plurality of terminal devices, respectively. The updater updates the display screen based on operation data indicative of an operation performed by the terminal device to the display area corresponding to the display data.

The display screen may include a nautical chart, and when the operation data indicative of an operation of setting a route is received, the updater may update the display screen to a display screen in which the route is set based on the operation data.

The display screen may include teaching material information indicative of teaching materials, and when the operation data including presentation information related to the teaching material information to be presented by a participant is received, the updater may update the display screen to a display screen including the presentation information.

According to the present disclosure, a joint project by a plurality of persons can be supported efficiently.

BRIEF DESCRIPTION OF DRAWINGS

The present disclosure is illustrated by way of example and not by way of limitation in the figures of the accompanying drawings, in which like reference numerals indicate like elements and in which.

DETAILED DESCRIPTION

Hereinafter, desirable embodiments of the present disclosure are described with reference to the accompanying drawings. Note that each embodiment illustrated below illustrates a method and device for implementing the technical idea of the present disclosure, and the technical idea of the present disclosure is not necessarily limited to the following embodiments. The technical idea of the present disclosure may be changed variously without departing from the technical scope described in the claims.

Embodiment 1

In this embodiment, different display areas of a display screen of a remote display device may be displayed on a plurality of terminal devices. When a change in the display area is requested by one terminal device, the display areas of some terminal devices may overlap with each other. In such a case, each display area may be set so as not to overlap with the display areas of other terminal devices.

<Configuration of Remote Display System>

Figure 1:
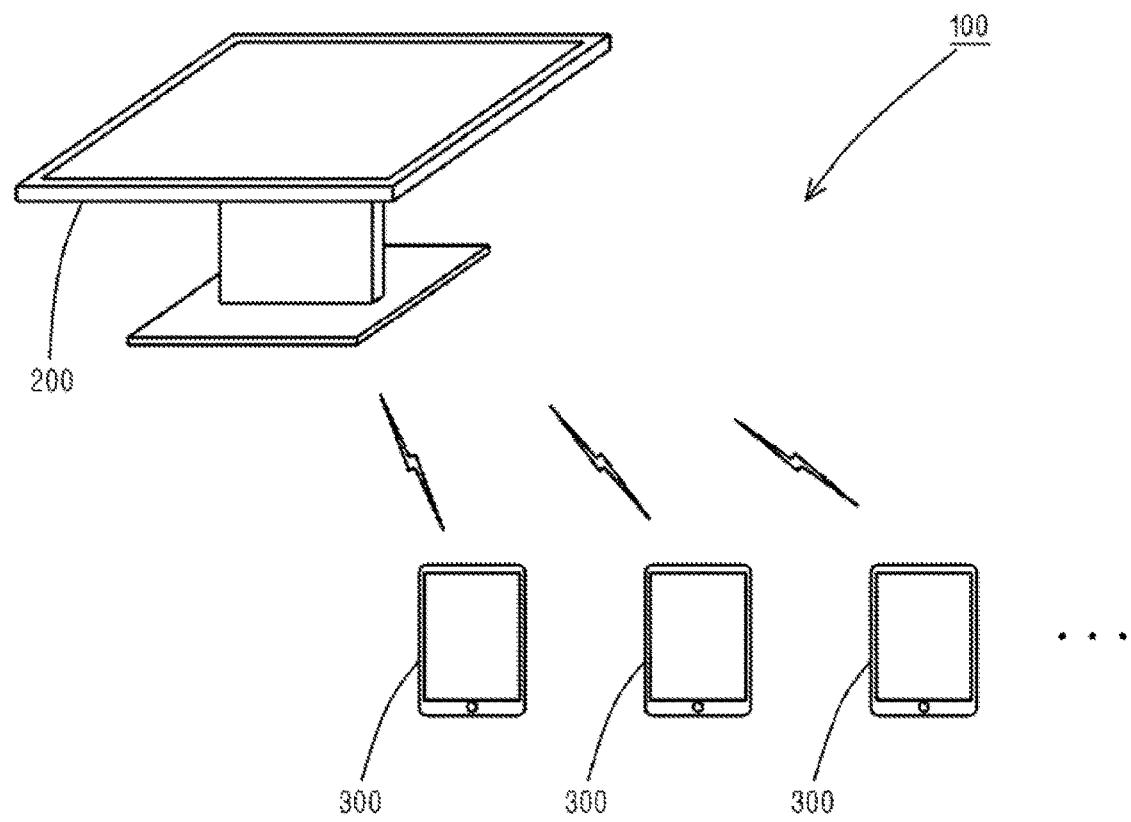
FIG. 1 is a view schematically illustrating a configuration of a remote display system according to Embodiment 1.

FIG. 1 is a view schematically illustrating a configuration of a remote display system according to this embodiment. As illustrated in FIG. 1, the remote display system 100 may include a remote display device 200 and a plurality of terminal devices 300. The remote display device 200 may be an electronic nautical chart display module which displays a nautical chart and is used for a route planning of a ship, and, for example, it is installed in a pontoon bridge for the ship. The remote display device 200 may be formed in a table shape and may be provided with a large-sized screen on an upper surface thereof, in order to allow a plurality of persons to use this device simultaneously. Moreover, the terminal device 300 may be a tablet in which a screen display and an input are possible. The remote display device 200 and the terminal device 300 may be wirelessly communicatable with each other.

Figure 2:
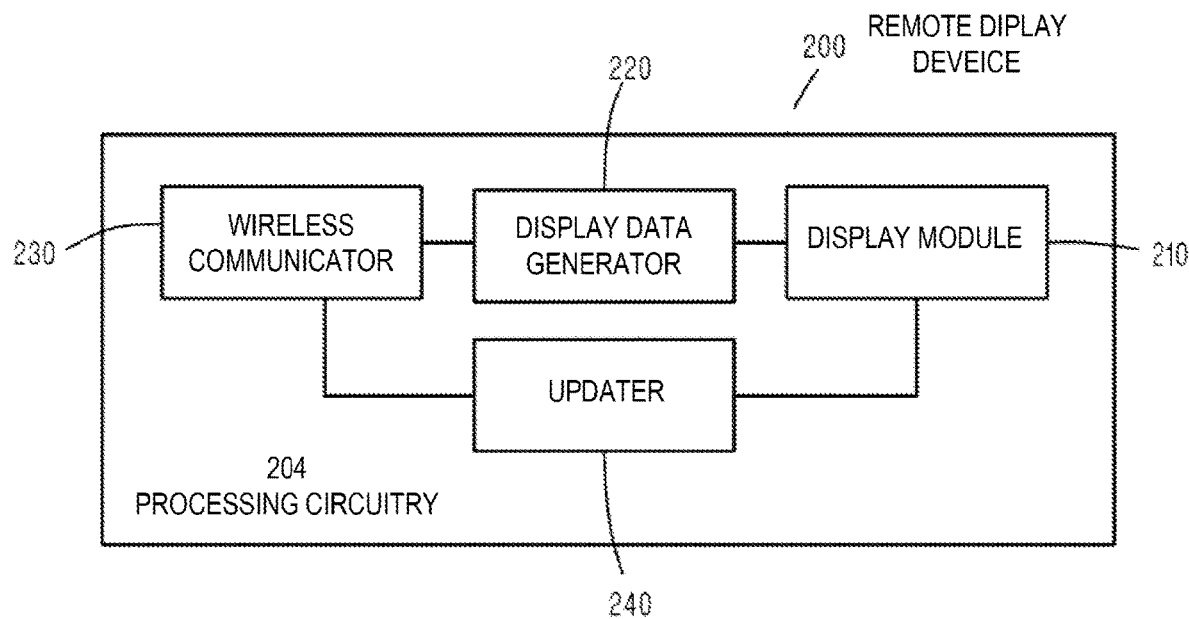
FIG. 2 is a functional block diagram illustrating a functional configuration of a remote display device according to Embodiment 1.

FIG. 2 is a functional block diagram illustrating a functional configuration of the remote display device 200. The remote display device 200 may have a wireless communication function via a wireless LAN. As illustrated in FIG. 2, the remote display device 200 may include functional blocks of a display module 210, a display data generator 220, a wireless communicator 230, and an updater 240. The display data generator 220 may generate a plurality of display data corresponding to mutually different display areas each of which is a part of a display screen displayed on the display module 210. The wireless communicator 230 may wirelessly communicate with the terminal devices 300 via the wireless LAN, and transmit the plurality of display data generated by the display data generator 220 to the respective terminal devices 300. Moreover, the wireless communicator 230 may receive operation data indicative of operation performed in the display area by using the terminal device 300. The updater 240 may update the display screen of the display module 210 based on the operation data received by the wireless communicator 230.

Figure 3:
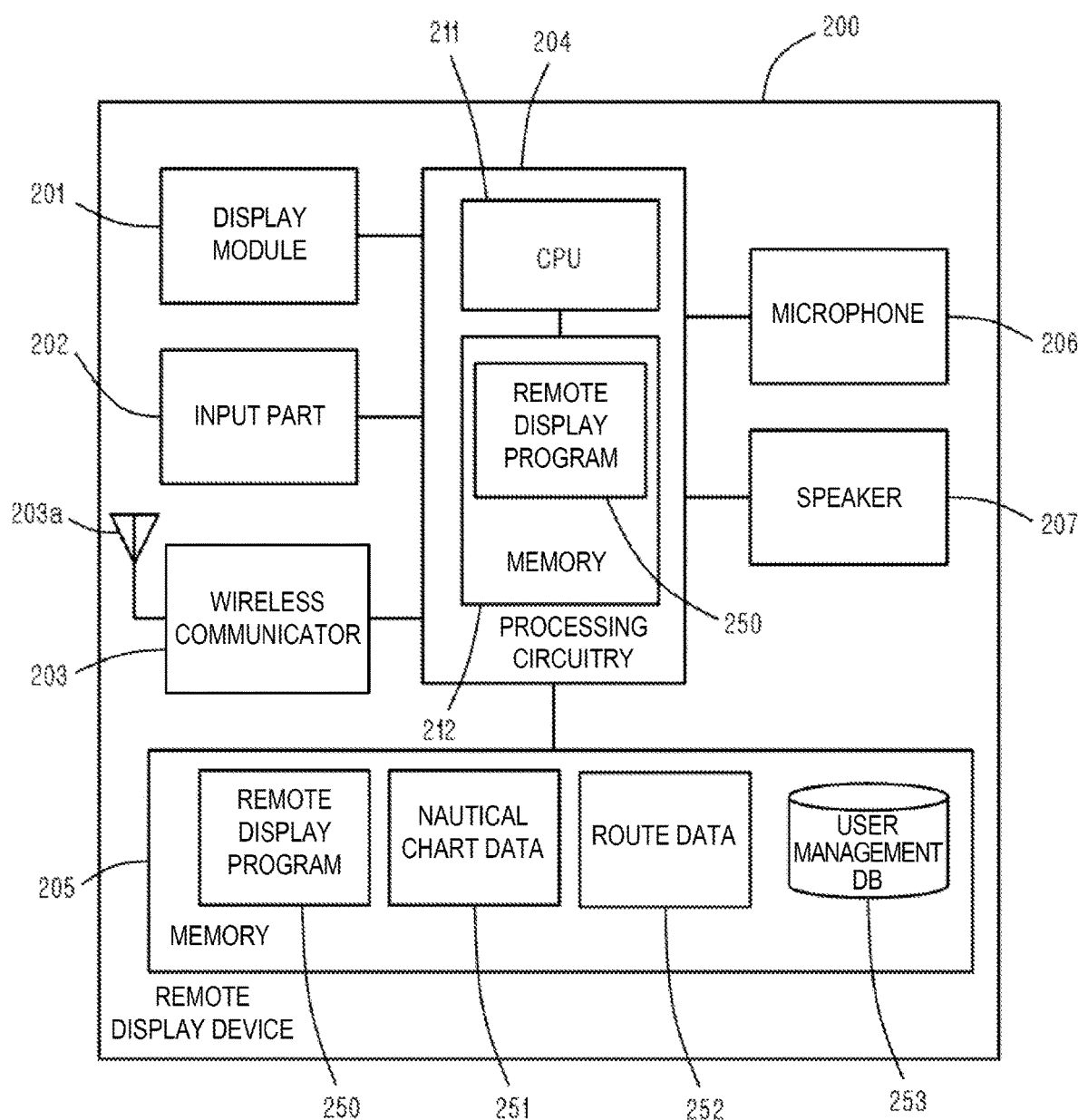
FIG. 3 is a block diagram illustrating one example of a hardware configuration of the remote display device according to Embodiment 1.

FIG. 3 is a block diagram illustrating one example of a concrete hardware configuration of the remote display device 200. The remote display device 200 may include a display module 201, an input part 202, a wireless communicator 203, a processing circuitry 204, a memory 205, a microphone 206, and a speaker 207. The display module 201 may be a large-sized (e.g., tens of inches) LCD (Liquid Crystal Display) or organic EL (Organic ElectroLuminescence) so that a plurality of persons can perform the route planning simultaneously. The display module 210 described above may be implemented by this display module 201. Moreover, the input part 202 may be a position input device, such as a transparent pressure-sensitive-type or capacitance-type touchpad. This input part 202 may have about the same size and shape as those of the display module 201, and may be pasted on the surface of the display module 201. Therefore, the display module 201 and the input part 202 may be constituted as an integral-type touch panel.

The wireless communicator 203 may be a communicating part capable of performing wireless communications complying with wireless LAN standards, such as IEEE802.11a/b/g/n/ac, and have an antenna 203a for wireless communications. The terminal device 300 (see FIG. 1) can perform wireless communications according to IEEE802.11a, b, g, n, or ac with the wireless communicator 203. The wireless communicator 230 described above may be implemented by this wireless communicator 203.

The processing circuitry 204 may include a CPU 211 and a memory 212, and control each part of the remote display device 200. The CPU 211 may execute a computer program in the memory 212. The CPU 211 may execute a remote display program 250 which is a computer program for remote display to make a remote display of a display screen possible, which will be described later. The display data generator 220 and the updater 240 which are described above may be implemented by this processing circuitry 204. The memory 205 may be a hard disk drive, and the remote display program 250 described above is installed therein. Moreover, the memory 205 may store nautical chart data 251 and route data 252, and the CPU 211 can read the nautical chart data 251 and the route data 252, and display a nautical chart on the display module 201 so that a route is displayed in a superimposed manner on the nautical chart.

Moreover, the memory 205 may be provided with a user management database (user management DB) 253 which stores information on users who use the remote display device 200. The user management DB 253 may store user names and passwords so as to be associated with each other.

Figure 4:
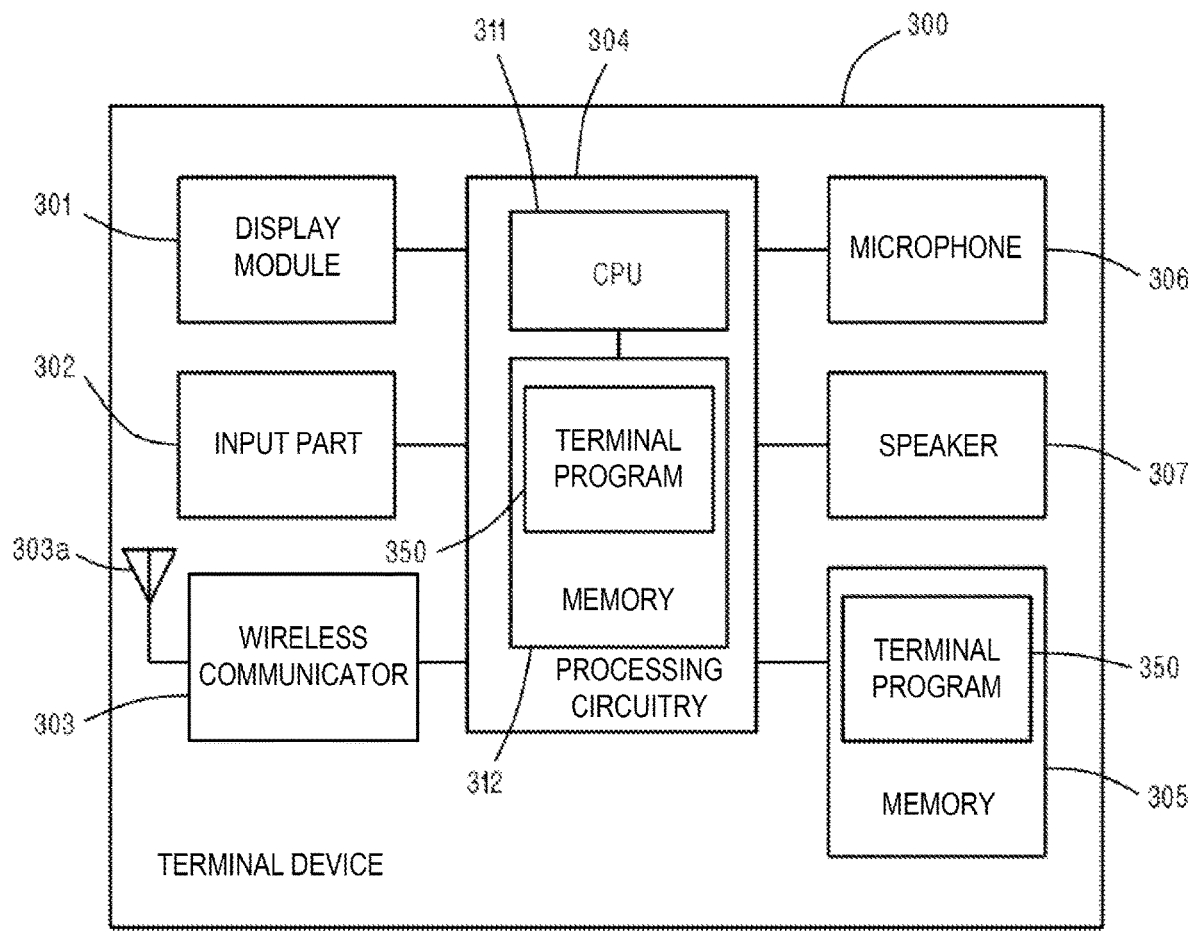
FIG. 4 is a block diagram illustrating a configuration of a terminal device according to Embodiment 1.

FIG. 4 is a block diagram illustrating a configuration of the terminal device 300. The terminal device 300 may include a display module 301, an input part 302, a wireless communicator 303, a processing circuitry 304, a memory 305, a microphone 306, and a speaker 307. Since the terminal device 300 is for one-person operation, the display module 301 may be a small (e.g., several inches to about ten inches) LCD or organic EL. Moreover, the input part 302 may be a position input device, such as a transparent pressure-sensitive-type or capacitance-type touchpad. The input part 302 may be pasted on the surface of the display module 301, and the display module 301 and the input part 302 may be constituted as an integral-type touch panel.

The wireless communicator 303 may be a communicating part capable of performing wireless communications complying with wireless LAN standards, such as IEEE802.11a/b/g/n/ac, and have an antenna 303a for wireless communications. By this wireless communicator 303, the terminal device 300 may be possible to perform wireless communications with the remote display device 200.

The processing circuitry 304 may include a CPU 311 and a memory 312, and control each part of the terminal device 300. The CPU 311 can execute a computer program in the memory 312, and may execute a terminal program 350 which is a computer program for terminal to make operation as described later possible. The memory 305 may be a flash memory, and the terminal program 350 described above may be installed therein.

Moreover, an access point for wireless LAN (not illustrated) may be installed in the pontoon bridge, and the remote display device 200 and each terminal device 300 may be constituted so as to wirelessly communicate through the access point.

<Operation of Remote Display System>

Below, operation of the remote display system 100 according to this embodiment is described. The remote display system 100 may execute each of processings, such as a login, a display area change, a route creation/correction, a voice call processing, and a logout.

[Login]

Figure 5:
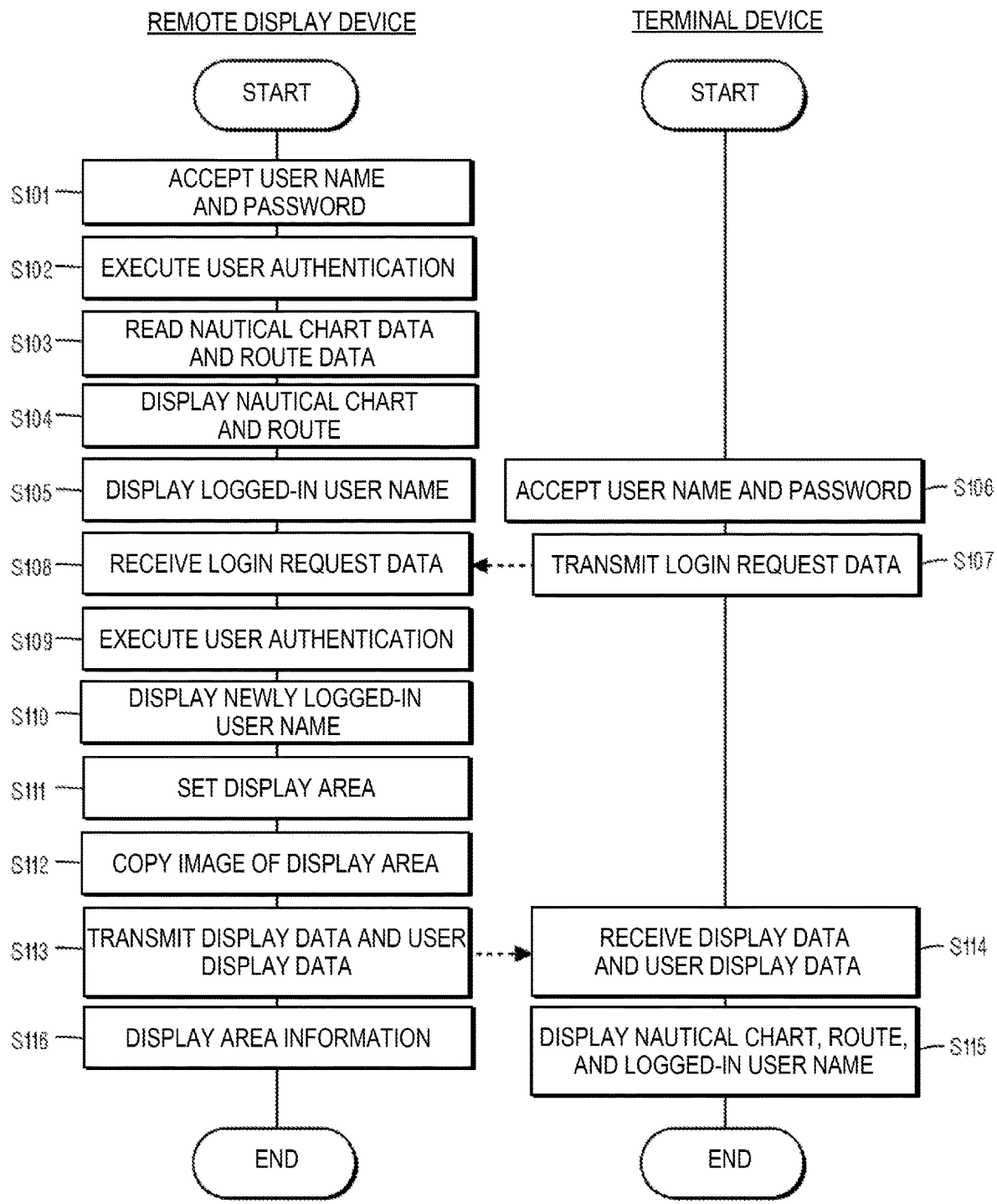
FIG. 5 is a flowchart indicative of a login procedure of the remote display system according to Embodiment 1.

First, the login is described. FIG. 5 is a flowchart illustrating a login procedure of the remote display system 100 according to this embodiment. When planning a route, the remote display program 250 may be executed by the CPU 211. The user who uses the remote display device 200 may enter his/her user name and password into the input part 202 to request a login. The CPU 211 may accept the input of the user name and password (Step S101). A plurality of persons may be possible to simultaneously login to the remote display device 200, and therefore, it may be also possible to enter a plurality of user names and passwords. The CPU 211 may execute a user authentication for comparing the accepted user name and password with those in the user management DB 253 to determine whether the user is a registered user (Step S102).

If the user authentication is successful, the CPU 211 may read the nautical chart data 251 and the route data 252 (Step S103), and display on the display module 201 the route so as to be superimposed on the nautical chart (Step S104). Note that, if the route has not been set yet, i.e., if the route data 252 does not exist, the CPU 211 may read only the nautical chart data 251 and display the nautical chart on the display module 201. Although not illustrated in FIG. 5, if the user authentication is failed, the CPU 211 may refuse the login, and therefore, the user may become impossible to operate the remote display system 100.

Figure 6:
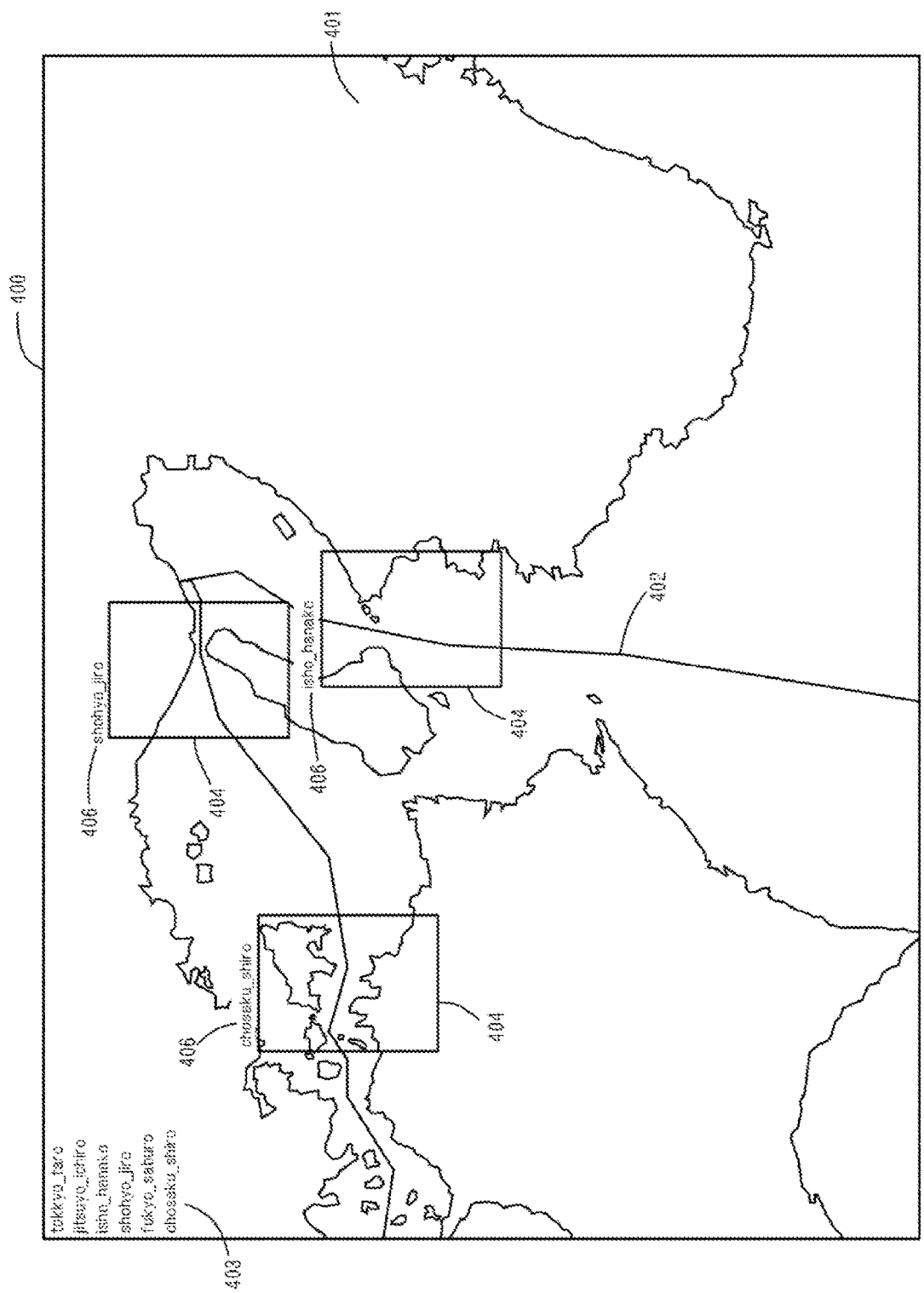
FIG. 6 is a view illustrating one example of a display screen of the remote display device according to Embodiment 1.

Moreover, the CPU 211 may display the logged-in user name at that time so as to be superimposed on the nautical chart (Step S105). FIG. 6 is a view illustrating one example of a display screen of the remote display device 200. In FIG. 6, "400" is the display screen, "401" is the nautical chart, and "402" is the route. An area where the user name is displayed is a part of the display screen, such as an upper left part or a lower right part of the display screen. FIG. 6 illustrates one example where the user names 403 are displayed on the upper left part of the display screen.

Referring again to FIG. 5, when the user who uses the terminal device 300 participates in the route planning, he/she may instruct an execution of the terminal program 350 to the terminal device 300, and the CPU 311 may execute this program. Moreover, this user may enter his/her user name and password into the input part 302 in order to log in the remote display system 100. The CPU 311 may accept the input of the user name and password (Step S106), and transmit login request data including the accepted user name and password to the remote display device 200 (Step S107). When the login request data is received (Step S108), the CPU 211 of the remote display device 200 may execute the user authentication by using the user name and password which are included in the login request data (Step S109).

Figure 7:
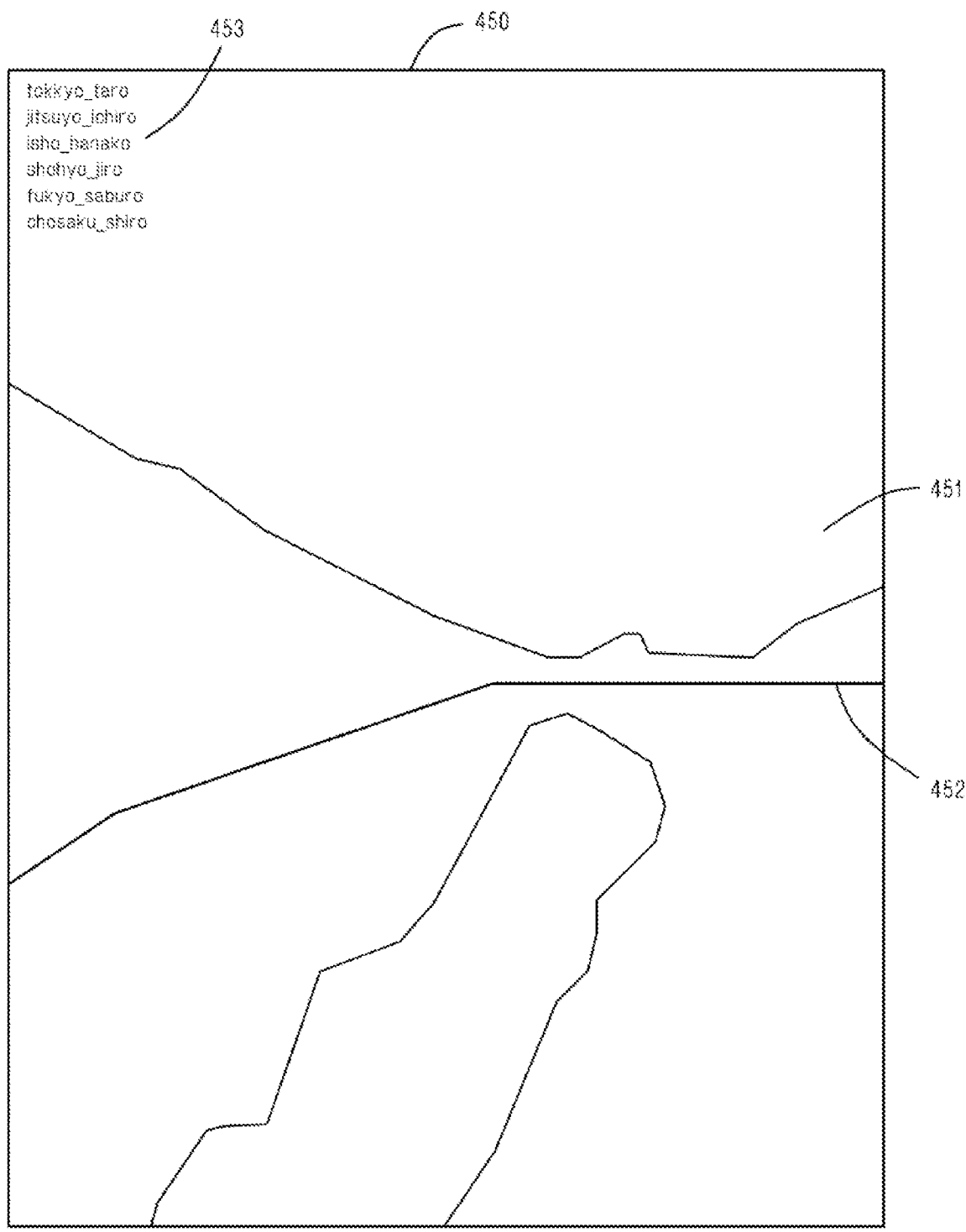
FIG. 7 is a view illustrating one example of a display screen of the terminal device according to Embodiment 1.

If the user authentication is successful, the CPU 211 may add the newly logged-in user name to the user name area in the display screen 400 (Step S110). Next, the CPU 211 may set a display area for the user (Step S111). This display area may be a part of the display screen 400 of the display module 201 of the remote display device 200, and may be an area which does not overlap with display areas assigned to other users. The CPU 211 may copy an image of the set display area, and generate display data (Step S112). Next, the CPU 211 may transmit to the terminal device 300 the generated display data, and user display data for displaying the information on the user who logged in at that time (Step S113). The terminal device 300 may receive the display data and the user display data (Step S114), and the CPU 311 may display on the display module 301 the nautical chart and route which are indicated by the received display data, and the user name indicated by the user display data (Step S115). FIG. 7 is a view illustrating one example of the display screen of the terminal device 300. In FIG. 7, "450" is the display screen, "451" is the nautical chart, and "452" is the route. The area where the user name is displayed is a part of the display screen 450, such as an upper left part or a lower right part of the display screen. FIG. 7 illustrates one example where the user names 453 are displayed on the upper left part of the display screen 450. Note that, although not illustrated in FIG. 5, when the user authentication is failed, the CPU 211 may refuse the login, and therefore, the display area will not be set for the user and the nautical chart and the route will not be displayed on the terminal device 300.

Referring to FIG. 5, the CPU 211 of the remote display device 200 may display area information indicative of the display area in the display screen 400 so as to be superimposed on the nautical chart 401 (Step S116). As illustrated in FIG. 6, the area information 404 may be a rectangular frame. The area information 404 may indicate that the image inside this frame is displayed on the terminal device 300. In addition, a user name 406 who displays this display area may be displayed in association with the area information 404. FIG. 6 illustrates one example where the user name 406 is displayed above the frame of the area information 404. Therefore, the user of the remote display device 200 can easily confirm which user is viewing which part of the display screen 400 by using the terminal device 300. As described above, the login may be finished.

[Display Area Change]

Figure 8:
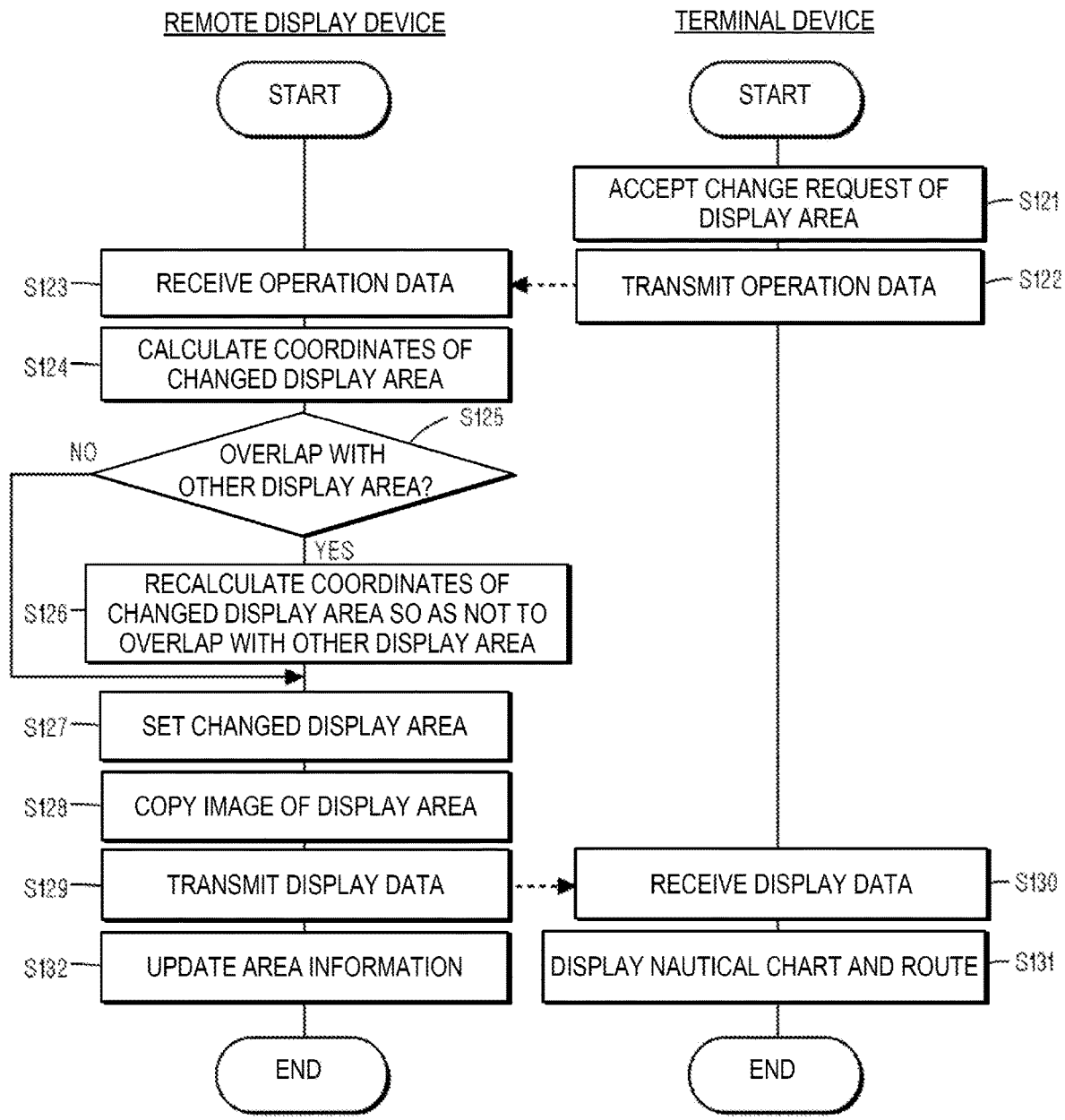
FIG. 8 is a flowchart illustrating a display area change procedure of the remote display system according to Embodiment 1.

Next, the display area change of the remote display system 100 is described. FIG. 8 is a flowchart illustrating a display area change procedure of the remote display system 100 according to this embodiment. The user who uses the terminal device 300 can request a change of the display area (i.e., moving, expanding, or contracting of the display area) by operating the input part 302. For example, when moving the display area, the user may swipe the input part 302 with a finger to a direction opposite to the direction in which the display area is to be moved to give the request. Moreover, when changing the size of the display area, the user may move two fingers away from or toward each other while the two fingers touching the input part 302 (so-referred to as "pinch out" and "pinch in") to give the request. The CPU 311 may accept the change request of the display area (Step S121), and transmit to the remote display device 200 operation data indicative of the type of operation performed to the user's input part 302 (Step S122).

When the operation data is received (Step S123), the CPU 211 of the remote display device 200 may calculate coordinates of the changed display area based on the received operation data (Step S124). In this processing, when the operation is the request for moving the display area, the CPU 211 may calculate a moving direction and a moving amount based on the operation data, and then calculate the coordinates of the changed display area based on the moving direction and the moving amount. Moreover, when the operation is the request for changing the size of the display area, the CPU 211 may calculate a magnification ratio or a reduction ratio based on the operation data, and then calculate the coordinates of the changed display area based on the magnification ratio or the reduction ratio.

Figure 9:
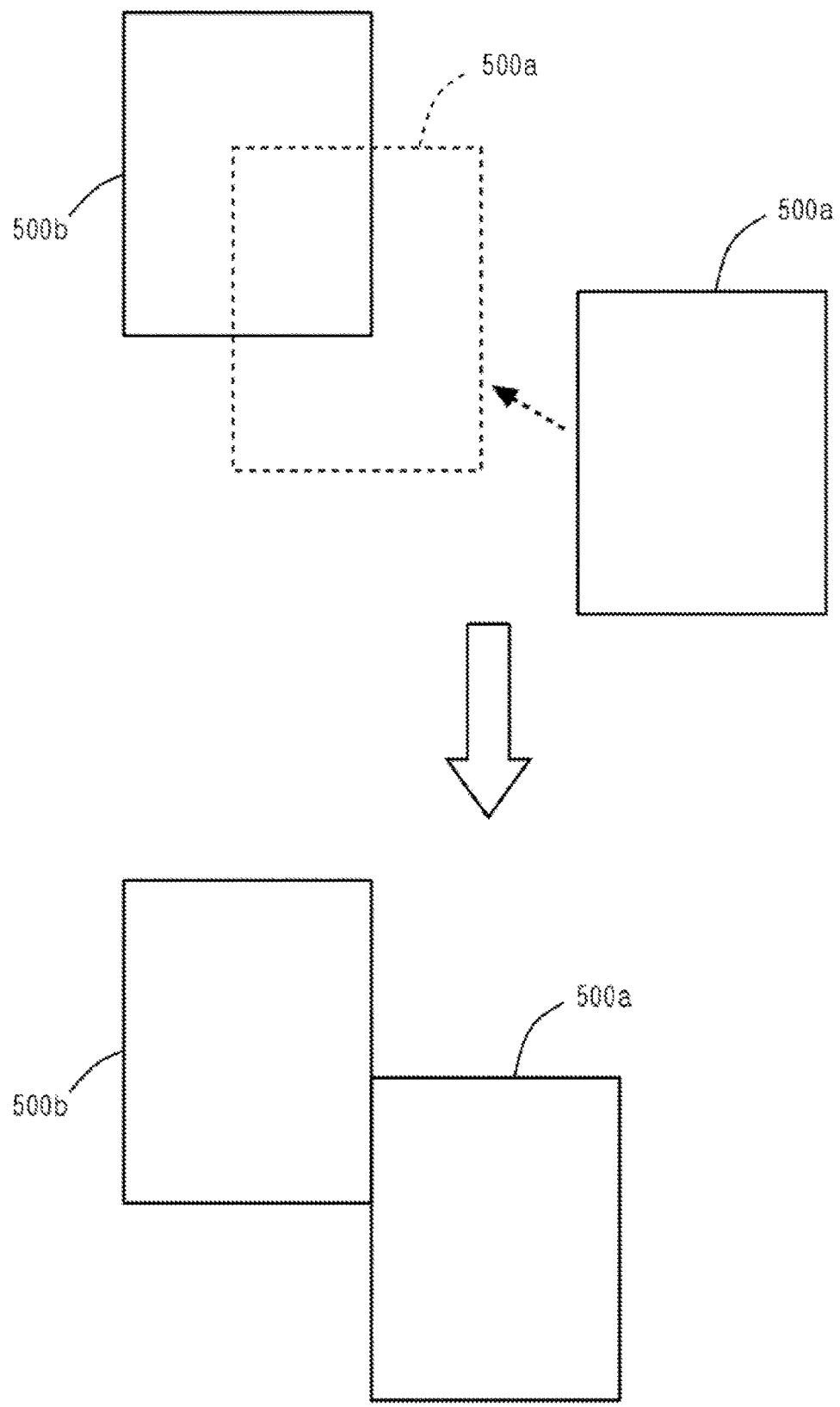
FIG. 9 is a view illustrating one example of processing for keeping two display areas from overlapping.

Next, the CPU 211 may determine whether the display area identified by the calculated coordinates overlaps with the display areas of other terminal devices 300 (Step S125). If the display area overlaps (YES at Step S125), the CPU 211 may again calculate the coordinates of the changed display area so that it does not overlap with the display areas of other terminal devices 300 (Step S126). This processing is described. FIG. 9 is a view illustrating one example of processing for keeping two display areas from overlapping. As a result of requesting the movement of a display area 500a of one terminal device 300a, if the moved position of the display area 500a overlaps with a display area 500b of another terminal device 300b, the position of the display area 500a may be changed so as not to overlap with the display area 500b. In this example, the coordinates may be recalculated so that the display area 500a is moved to a position contacting the contour of the display area 500b which exists in the requested moving direction. Note that, although the position of the display area 500a is moved so as to contact the contour of the display area 500b, the position of the display area 500a may not contact the contour of the display area 500b as long as it does not overlap with the display area 500b of another terminal device 300b. Moreover, instead of the display area 500a which is requested for the change, the display area 500b of another terminal device 300b may be moved, or both the display areas 500a and 500b may be moved so that the display areas 500a and 500b do not overlap with each other.

Referring again to FIG. 8, when the coordinates of the display area are calculated, the CPU 211 may set as a display area identified by the coordinates as the changed display area (Step S127). Moreover, if the display area identified by the calculated coordinates does not overlap with the display areas of other terminal devices 300 (NO at Step S125), the CPU 211 may transit to Step S127 as it is, and it may set this display area as the changed display area (Step S127). After the display area is set, the CPU 211 may copy the image in the set display area, generate the display data (Step S128), and transmit the generated display data to the terminal device 300 (Step S129). The terminal device 300 may receive the display data (Step S130), and the CPU 311 may display on the display module 301 the nautical chart and route which are indicated by the received display data (Step S131). Moreover, the CPU 211 of the remote display device 200 may change the area information in the display screen 400 into the calculated coordinates (Step S132). As described above, the display area change may be finished. According to this display area change, while the display screen 450 of the terminal device 300 is updated by the new display area, the positions of the area information 404 and the user name 406 in the display screen 400 of the remote display device 200 may be changed, thereby updating the display screen 400.

[Route Creation/Correction]

Figure 10:
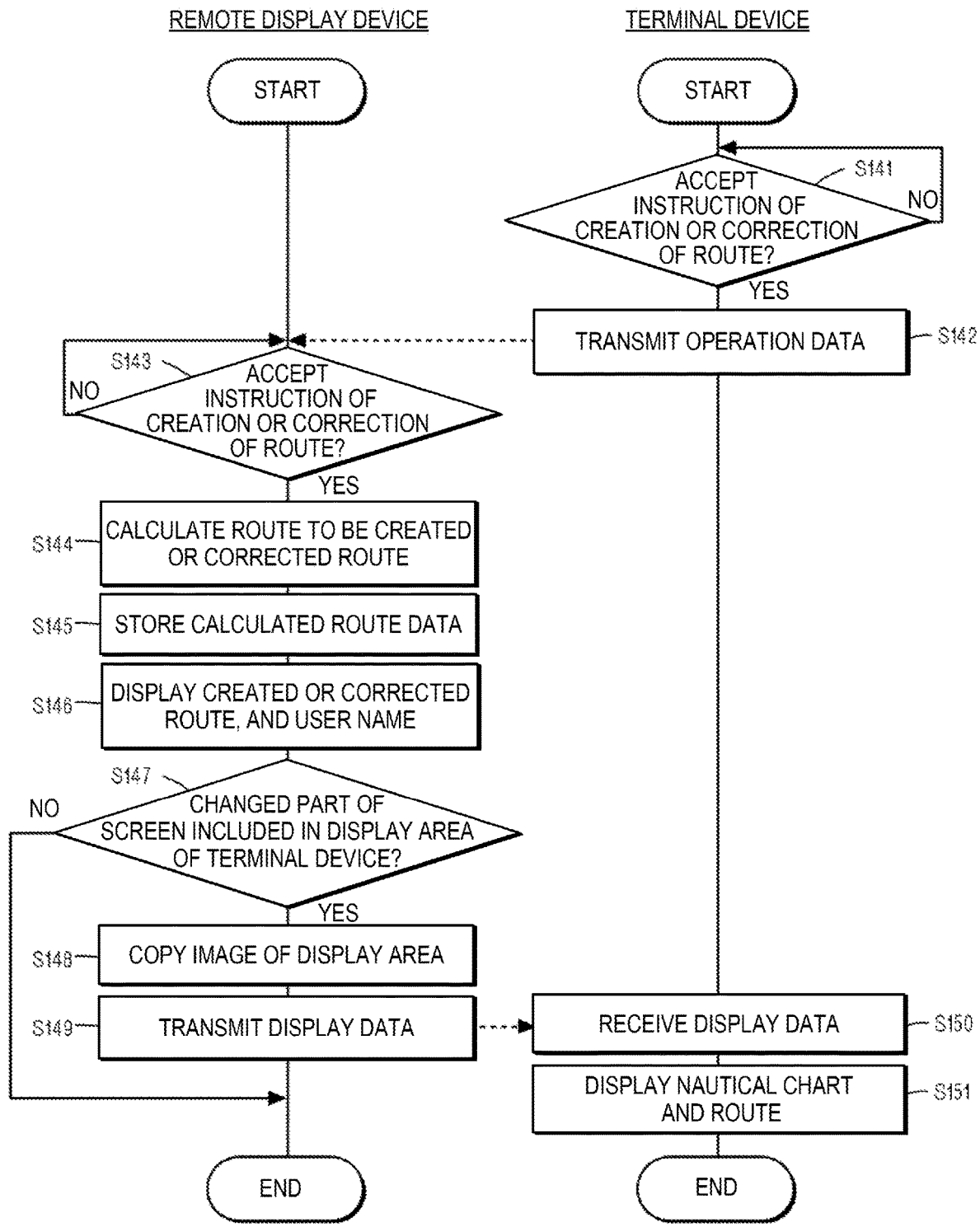
FIG. 10 is a flowchart illustrating a route creation/correction procedure of the remote display system according to Embodiment 1.

Next, the route creation/correction of the remote display system 100 is described. FIG. 10 is a flowchart illustrating a route creation/correction procedure of the remote display system 100 according to this embodiment. The user who directly may operate the remote display device 200 and the user who operates the terminal device 300 can create or correct a route. When the user who directly operates the remote display device 200 creates or corrects a route, he/she can instruct a creation or correction of a route by giving a required input to the input part 202, such as carrying out, in the nautical chart 401 displayed on the display module 201, a touch operation etc. at a position of the newly creating route, or the position of the already created route 402 (see FIG. 6). On the other hand, when the user who operates the terminal device 300 creates or corrects a route, he/she can instruct a creation or correction of a route by giving a required operation to the input part 302, such as carrying out, in the nautical chart 451 displayed on the display module 301, a touch operation etc. at a position of a newly creating route, or the position of the already created route 452 (see FIG. 7).

The CPU 311 of the terminal device 300 may determine whether the instruction of creation or correction of a route is accepted (Step S141), and if the instruction is accepted (YES at Step S141), it may transmit operation data indicative of an operation amount of the input part 302 by the user to the remote display device 200 (Step S142). If the instruction of creation or correction of a route is not accepted (NO at Step S141), the CPU 311 may repeat the processing at Step S141.

The CPU 211 of the remote display device 200 may determine whether the operation instructing a creation or correction of a route is accepted (Step S143). This processing may be possible to determine both of whether the operation is given to the input part 202 of the remote display device 200 and whether the operation data is received from the terminal device 300. If the operation instructing a creation or correction of a route is not given to any of the remote display device 200 and the terminal device 300 (NO at Step S143), the CPU 211 may repeat the processing at Step S143. On the other hand, if the operation of instructing a creation or correction of a route is given to any of the remote display device 200 and the terminal device 300 (YES at Step S143), the CPU 211 may calculate the route to be created or the corrected route based on the operation data (Step S144), store the route data 252 indicative of the created or corrected route (Step S145), if a new route is created, display this route on the nautical chart 401, and, on the other hand, if the route 402 is corrected, update the route to the corrected route 402, and display the user name of the user who created or corrected the route 402 on the updating part of the route 402 to update the display screen 400 (Step S146).

Figure 11:
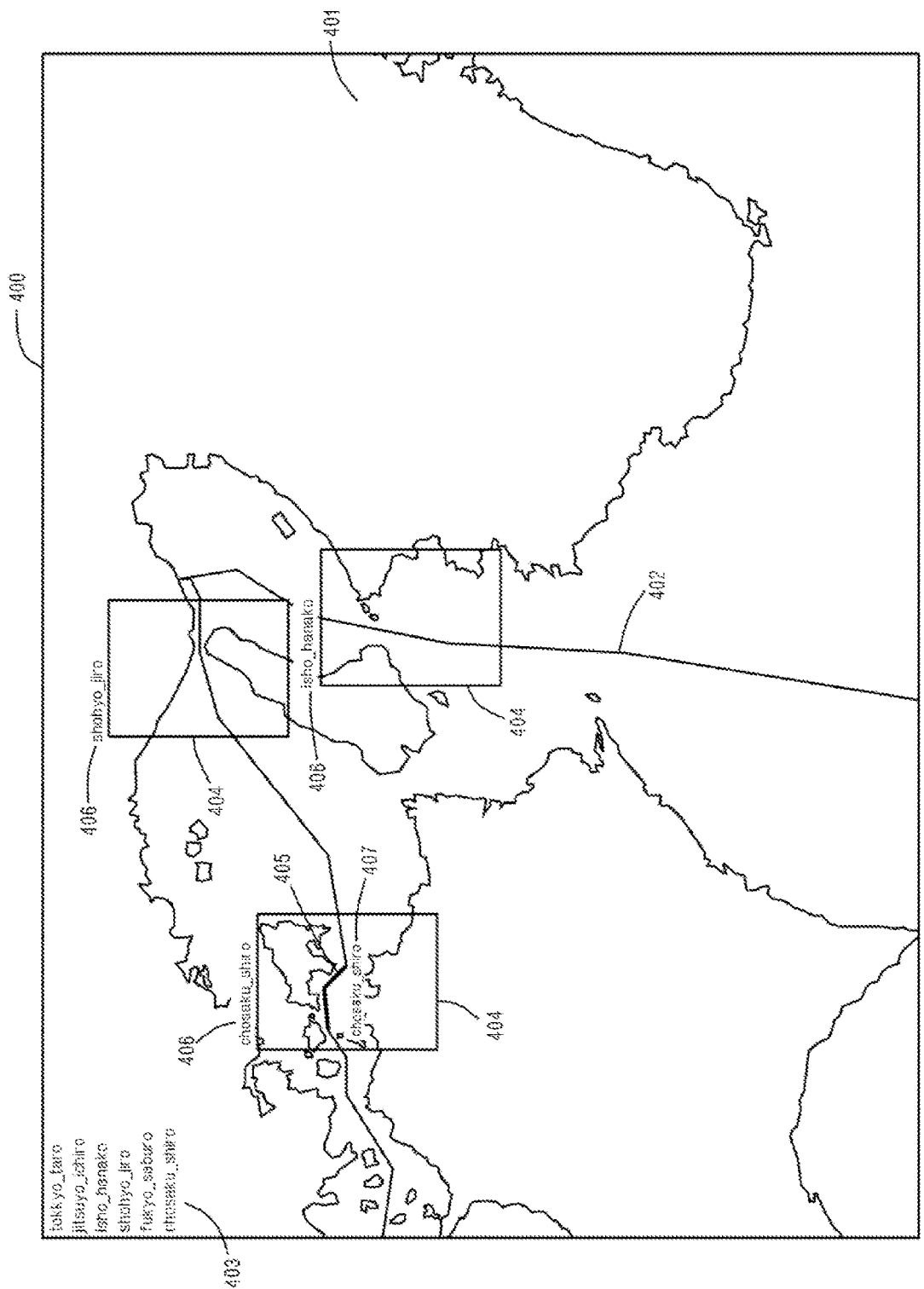
FIG. 11 is a view illustrating one example of a display screen of the remote display device when a correction of a route is made.

FIG. 11 is a view illustrating one example of the display screen of the remote display device 200 when the correction of a route is made. In this figure, a corrected part 405 of the route 402 is illustrated by a thick line. A name 407 of the user who made the correction is displayed near the corrected part 405. Therefore, it may become easier to recognize the user who made the correction. As illustrated in FIG. 11, the corrected part 405 of the route 402 may be displayed in a display form different from other parts, or the corrected part 405 may be displayed in the same display form as other parts. When displaying the corrected part 405 in the display form different from other parts, other than changing the thickness of the line indicative of the route 402 as illustrated in FIG. 11, the color of the line may be changed, or the type of line (a solid line, a broken line, etc.) may be changed.

Referring again to FIG. 10, the CPU 211 may determine whether the changed part 402 of the display screen 400 (i.e., the new route 402) is included in the display area of the terminal device 300 (Step S147). If included (YES at Step S147), the CPU 211 may copy the image in the set display area to generate the display data (Step S148), and transmit the generated display data to the terminal device 300 (Step S149). The terminal device 300 may receive the display data (Step S150), and the CPU 311 may display the nautical chart indicated by the received display data on the display module 301 (Step S151). As a result, the display screen may be updated by the display screen 450 including the new route 402. Moreover, if the new route 402 is not included in the display area of the terminal device 300 (NO at Step S147), the CPU 211 may end the processing. As described above, the route creation/correction may be finished.

[Voice Call]

Figure 12:
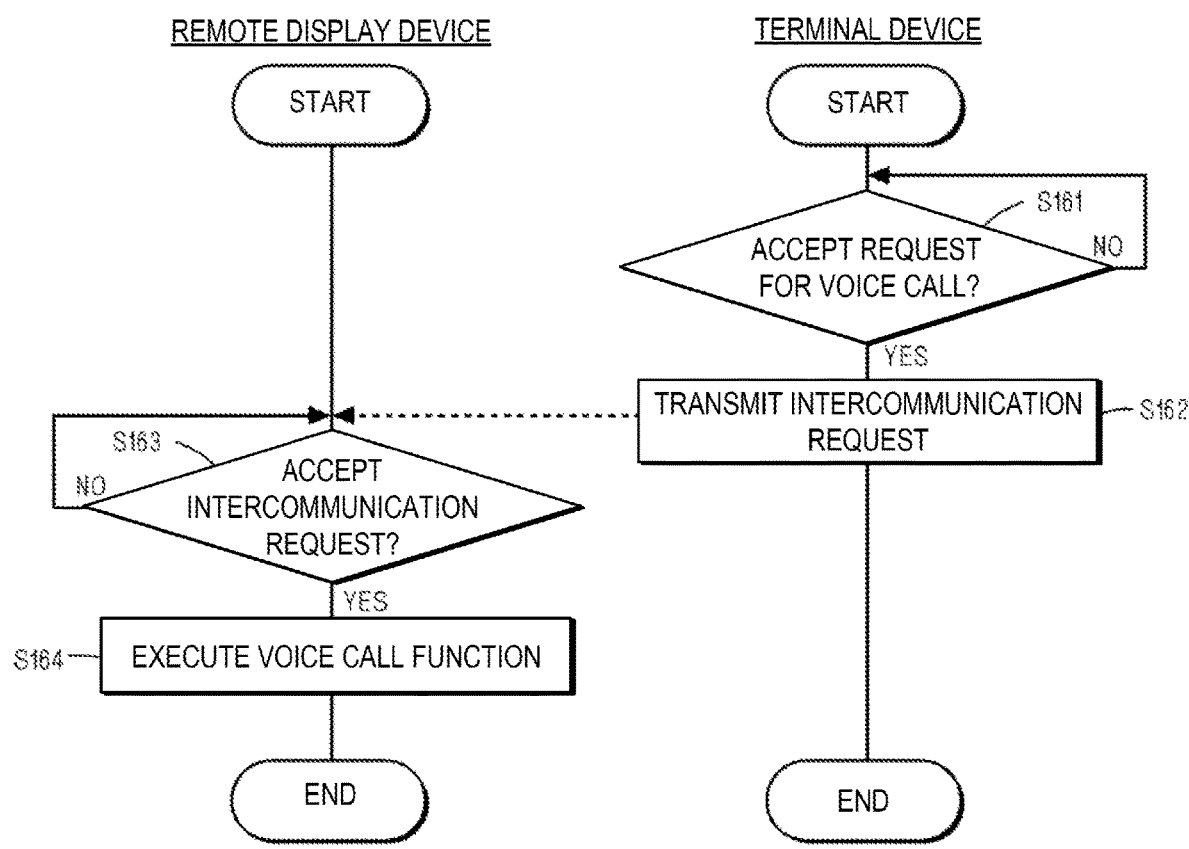
FIG. 12 is a flowchart illustrating a voice call procedure of the remote display system according to Embodiment 1.

Next, the voice call of the remote display system 100 is described. FIG. 12 is a flowchart illustrating a voice call procedure of the remote display system 100 according to this embodiment. The remote display device 200 may have a voice call function between users who use the remote display device 200 and the terminal devices 300. The user who uses the remote display device 200 can give to the input part 202 an operation of specifying the name 403 of the user to which he/she wants to call among the names 403 of the users included in the display screen 400. On the other hand, the user who uses the terminal device 300 can give to the input part 302 an operation of specifying the user name of the user to which he/she wants to call among the names 453 of the users included in the display screen 450. Thus, the remote display device 200 and the terminal devices 300 may be each acceptable of the request for the voice call with the specified user name.

The CPU 311 of the terminal device 300 may determine whether the request for the voice call with the specified user name is accepted (Step S161). If the request is accepted (YES at Step S161), the CPU 311 may transmit an intercommunication request including the specified user name to the remote display device 200 (Step S162). If the request for the voice call is not accepted (NO at Step S161), the CPU 311 may repeat the processing at Step S161.

The CPU 211 of the remote display device 200 may determine whether the intercommunication request with the specified user name is accepted (Step S163). This processing may be possible to determine both of whether the operation of requesting the voice call is given to the input part 202 of the remote display device 200, and whether the intercommunication request is received from the terminal device 300. If the intercommunication request is given to neither the remote display device 200 nor the terminal device 300 (NO at Step S163), the CPU 211 may repeat the processing at Step S163. On the other hand, if the intercommunication request is given to any of the remote display device 200 and the terminal device 300 (YES at Step S163), the CPU 211 may transmit data for notifying the request for the voice call to the terminal device 300 used by the user identified by the specified user name, and the terminal device 300 may receive this data and notify the user through a screen indication or audio that there is a request for the voice call. If the user response to this request, he/she may perform an input operation for permitting the voice call to the input part 302, and, thereby, the CPU 211 may execute the voice call function between the users (Step S164). In the voice call function, the user who uses the remote display device 200 can use the microphone 206 and the speaker 207 and the user who uses the terminal device 300 can use the microphone 306 and the speaker 307 to perform the two-way voice call. As described above, the voice call may be finished. For example, when a certain user created or corrected a route, another user who confirmed the creation or correction through the display screen may want to confirm the intention of the creation or correction of the route. In such a case, the user can easily confirm the intention by performing the voice call between these users.

[Logout]

Next, the logout of the remote display system 100 is described. When the user who uses the remote display device 200 or the terminal device 300 requests a logout, the remote display system 100 may perform the logout. When the user who uses the remote display device 200 operates the input part 202 to request the logout, the CPU 211 may execute the logout and delete the user name 403 of this user from the display screen 400. On the other hand, when the user who uses the terminal device 300 operates the input part 302 to request the logout, the terminal device 300 may transmit a logout request to the remote display device 200, and the CPU 211 of the remote display device 200 may execute the logout and delete the user name 403 and the area information 404 of this user from the display screen 400.

By configuring as described above, the mutually different display areas of the display screen 400 of the remote display device 200 can be displayed on the plurality of terminal devices 300, thereby supporting the efficient joint project by the plurality of users. Moreover, since a duplication of the display area can be prevented, any confusion in the joint project caused by the plurality of users creating or correcting the same part of the route during the same period can be prevented.

Embodiment 2

In this embodiment, the remote display device which is the electronic nautical chart display module may read nautical chart data with a larger range than the display screen and generate a nautical chart for display, and a part of the display nautical chart may be displayed as the display screen. When a display request of the outside of the display screen is given by the terminal device, the remote display device may set the display area including the outside of the display screen, and display this display area on the terminal device.

<Configuration of Remote Display System>

Since the configurations of the remote display system according to this embodiment are similar to the configurations of the remote display system 100 according to Embodiment 1, the same components are denoted with the same reference characters to omit the description thereof.

<Operation of Remote Display System>

Operation of the remote display system 100 according to this embodiment is described. Note that since the route creation/correction, the voice call, and logout are similar to those described in Embodiment 1, the description is omitted.

[Login]

Figure 13:
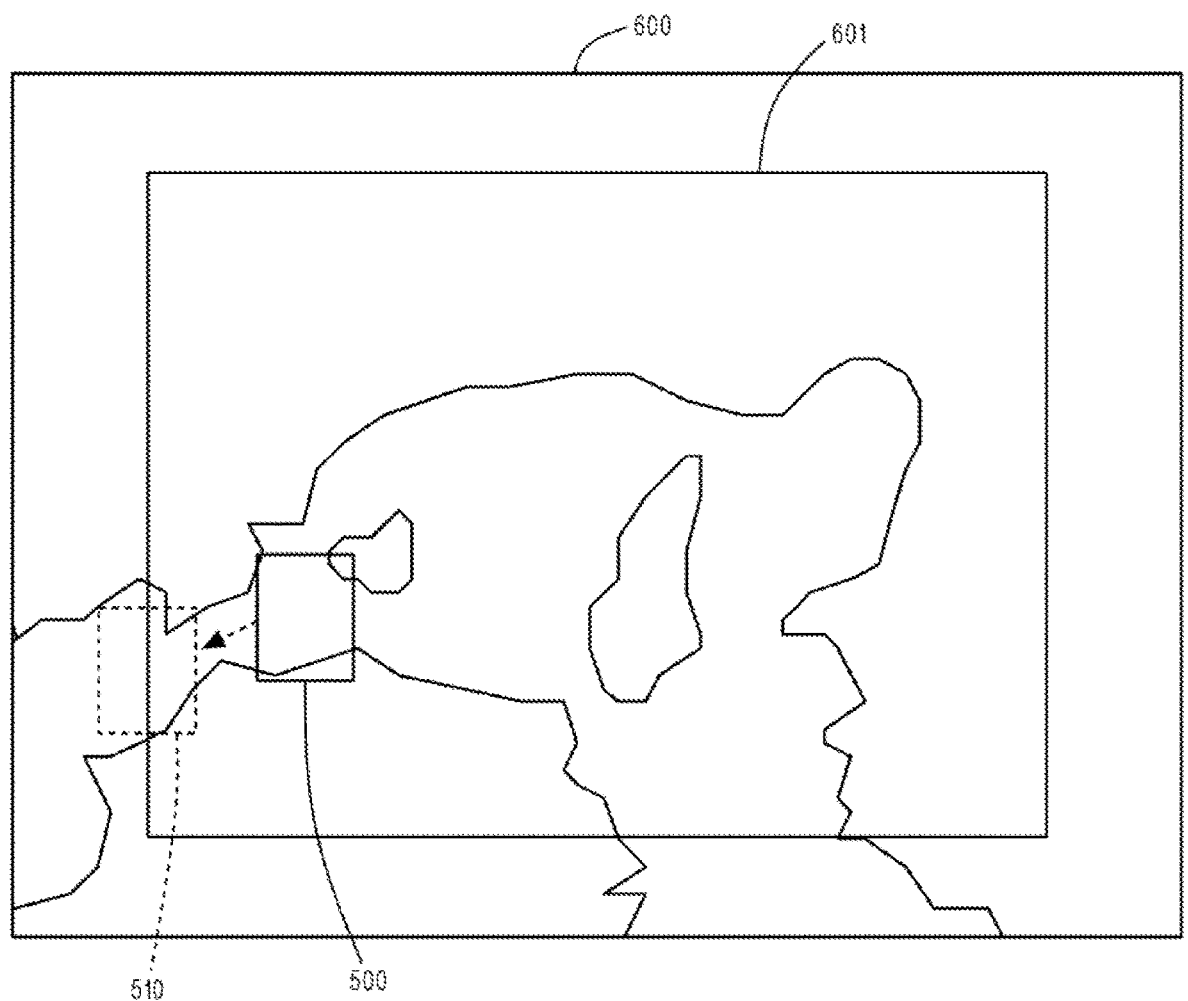
FIG. 13 is a view illustrating a range of a display screen of a remote display device according to Embodiment 2.

A login executed by the remote display system 100 according to this embodiment is described with reference to FIG. 5. In this embodiment, at Step S103, the CPU 211 may read nautical chart data with a larger range than a display range of the display module 201 (i.e., the range which constitutes the display screen 400). Moreover, at Step S104, the CPU 211 may generate an image for screen display of the range of the nautical chart data based on the read nautical chart data (hereinafter, referred to as a "displayable range"), and display on the display module 201 an image with a range (hereinafter, referred to as a "display range") of the generated image smaller than the displayable range, as the display screen 400. FIG. 13 is a view illustrating a range of the display screen of the remote display device 200 according to this embodiment. The remote display device 200 may hold the image of the displayable range 600 in the memory 212, and display only the image of the display range 601 among the image of the displayable range 600. Since other processings in the login according to this embodiment are similar to those described in Embodiment 1, the description is omitted.

[Display Area Change]

Figure 14:
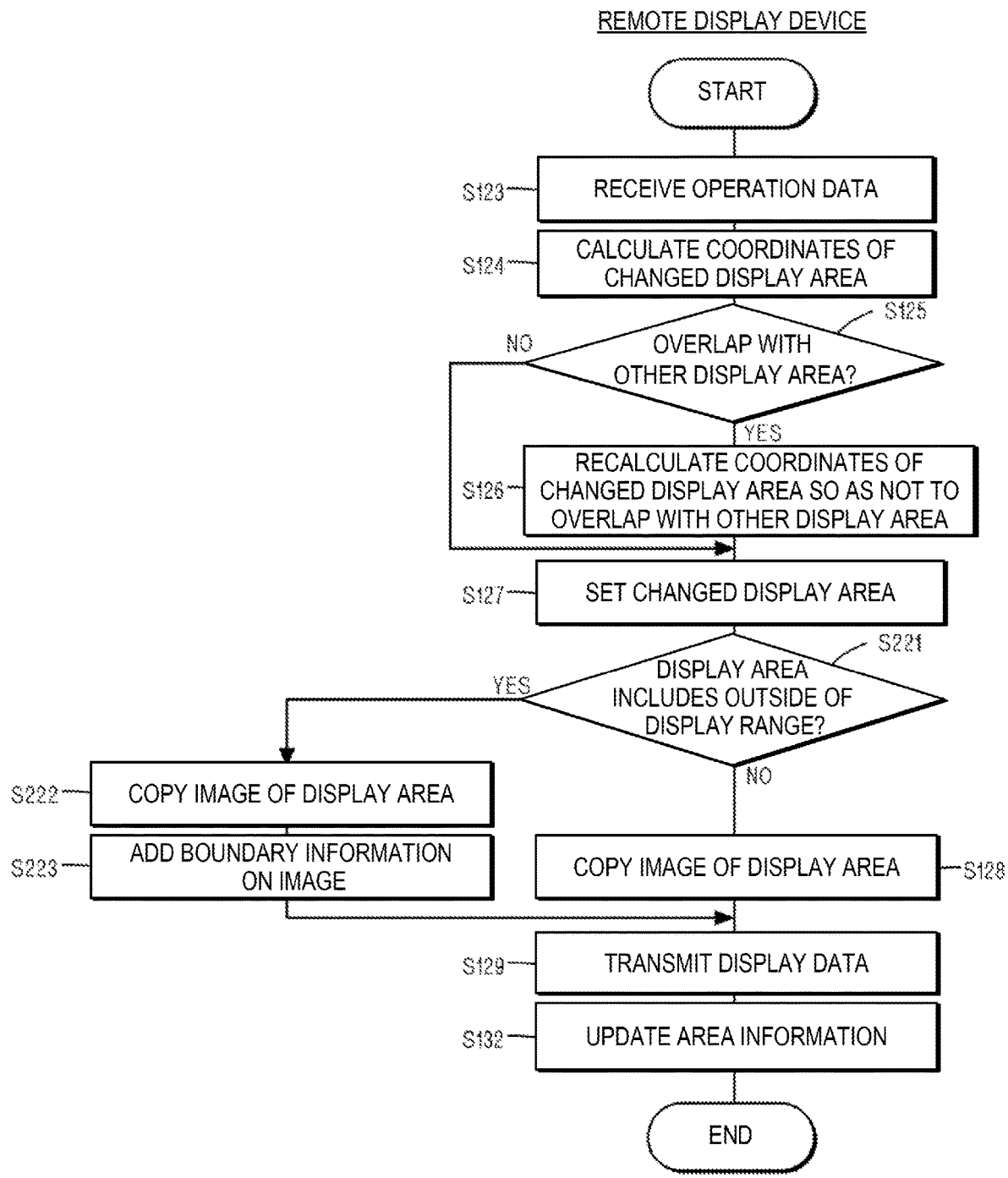
FIG. 14 is a flowchart illustrating a display area change procedure of the remote display device according to Embodiment 2.

Next, a display area change executed by the remote display system 100 according to this embodiment is described. FIG. 14 is a flowchart illustrating a display area change procedure of the remote display device 200 according to this embodiment. Since processings at Steps S121 to S127 are similar to those described in Embodiment 1, the description thereof is omitted.

When there is a change request of the display area from the terminal device, the CPU 211 of the remote display device 200 may set the changed display area, and it may then determine whether the set display area includes the outside of the display range 601, i.e., whether the display area is changed to the outside of the display range 601 (Step S221). One example of a case where the set display area includes the outside of the display range 601 is illustrated in FIG. 13. In the example of FIG. 13, as a result of the request for moving the display area 500, the display area 500 is set as a range 510 including the outside of the display range 601.

Figure 15:
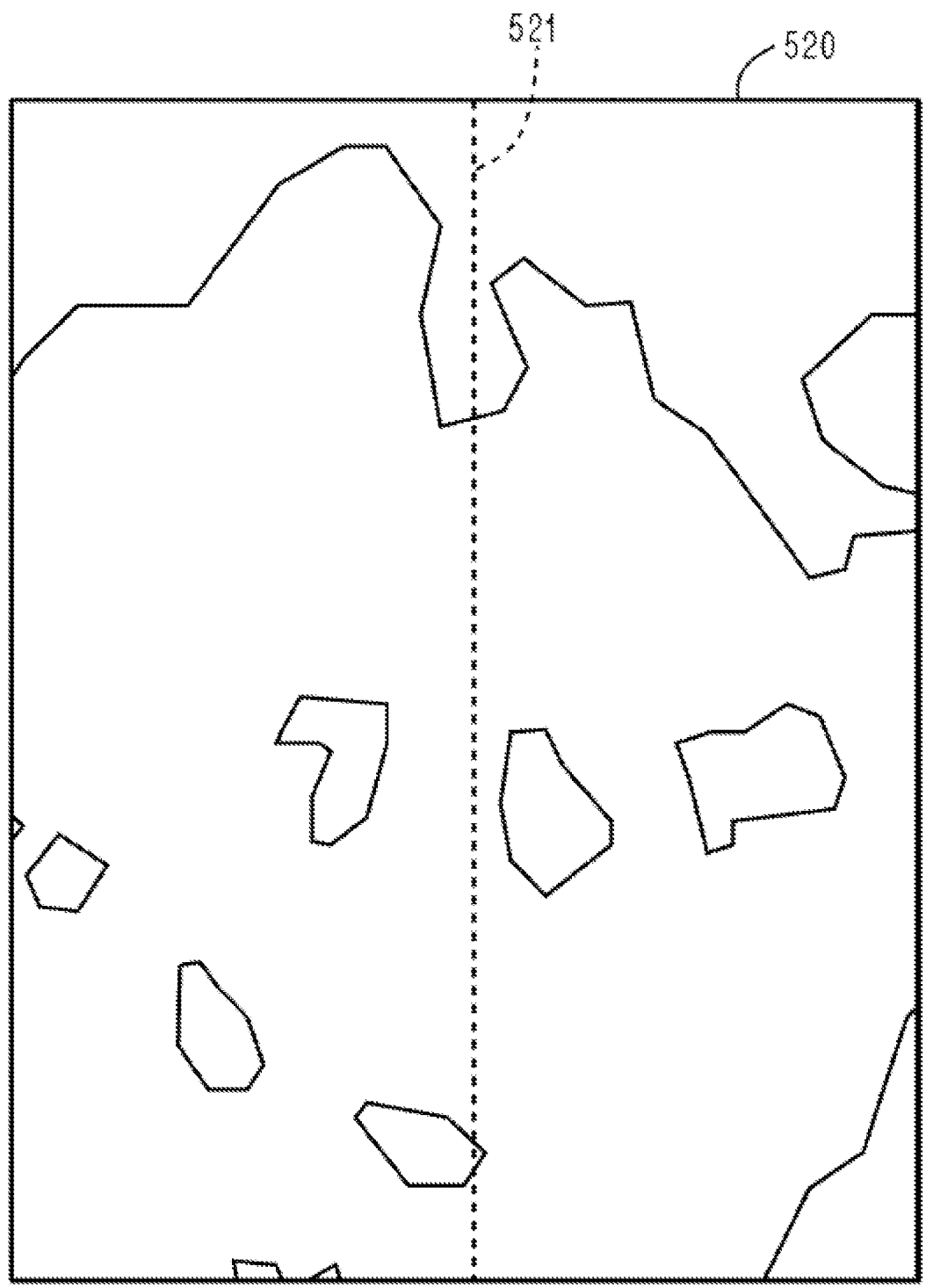
FIG. 15 is a view illustrating one example of an image of a display area to which boundary information is added.

If the set display area does not include the outside of the display range 601 (NO at Step S221), the CPU 211 may transit the processing to Step S128. On the other hand, if the set display area includes the outside of the display range 601 (YES at Step S221), the CPU 211 may copy the image of the set display area from the image of the displayable range 600 (Step S222), and generate the display data by adding boundary information on the display range to the image (Step S223). The CPU 211 may then transit the processing to Step S129. Note that since processings at Steps S129 to S132 are similar to those described in Embodiment 1, the description thereof is omitted. FIG. 15 is a view illustrating one example of the image of the display area to which the boundary information is added. As illustrated in FIG. 15, boundary information 521 may be added to a display image 520 of the terminal device 300. By adding the boundary information 521, the user of the terminal device 300 can recognize that the display area of the terminal device 300 is offset from the display range 601 of the remote display device 200. Therefore, the user can operate to again move the display area into the display range 601 as needed, and therefore, it can be prevented that other users create or correct a route in a range which is different from the working range.

Embodiment 3

In this embodiment, when the terminal device requests a change in the size of the display area or a movement of the display area to the outside of the display screen of the remote display device, the remote display device which is the electronic nautical chart display module may read an image of which the resolution is different from the image displayed by the remote display device or an image outside the display screen, and display this image on the terminal device.

<Configuration of Remote Display System>

In this embodiment, the memory 205 may store a plurality of kinds of nautical chart data 251 of different resolutions. Since other configurations of the remote display system according to this embodiment are similar to the configurations of the remote display system 100 according to Embodiment 1, the same components are denoted with the same reference characters to omit the description thereof.

<Operation of Remote Display System>

Operation of the remote display system 100 according to this embodiment is described. Note that since the login, the route creation/correction, the voice call, and the logout are similar to those described in Embodiment 1, the description thereof is omitted.

[Display Area Change]

Figure 16:
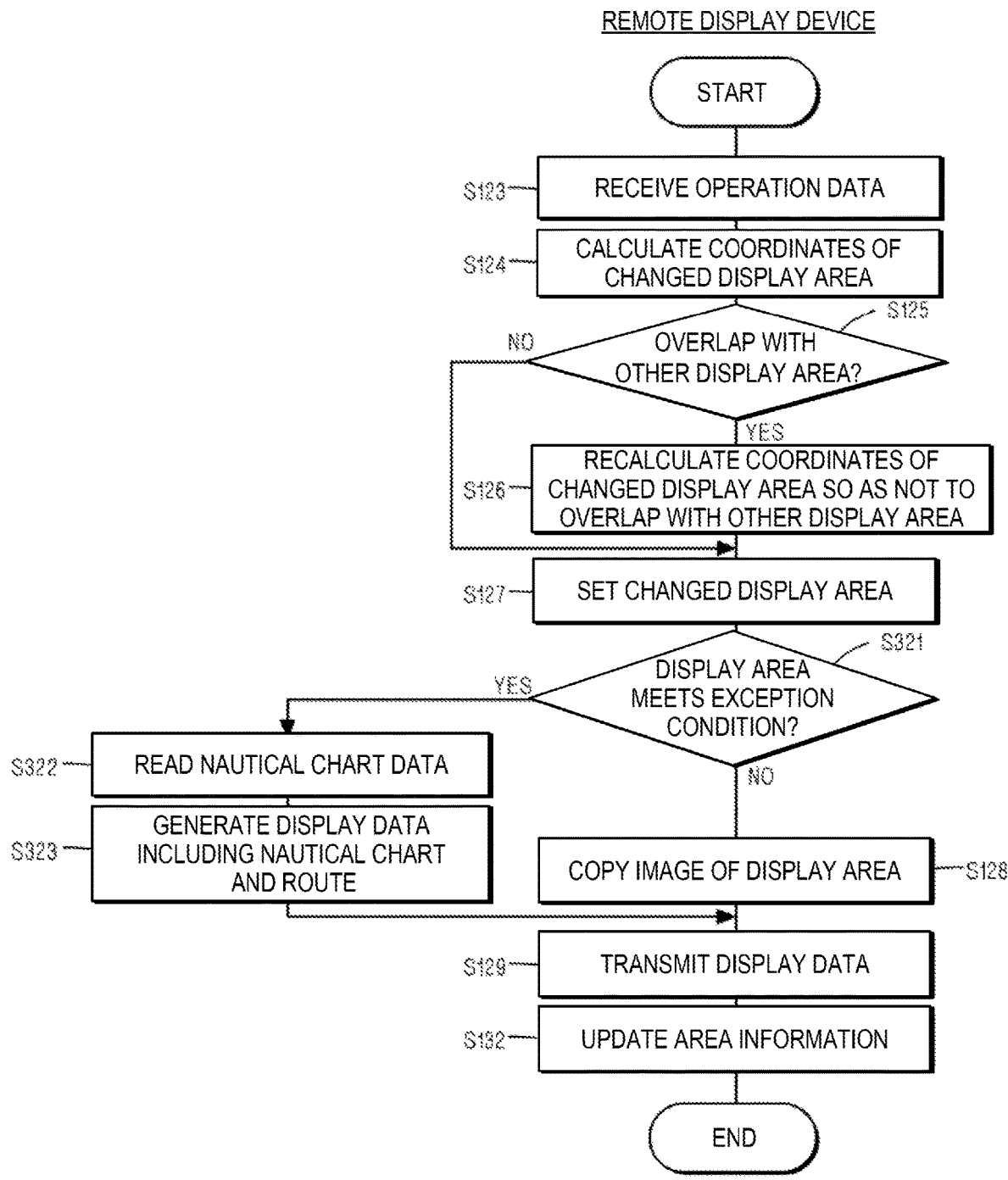
FIG. 16 is a flowchart illustrating a display area change procedure of a remote display device according to Embodiment 3.

Next, a display area change executed by the remote display system 100 according to this embodiment is described. FIG. 16 is a flowchart illustrating a display area change procedure of the remote display device 200 according to this embodiment. Since processings at Steps S121 to S127 are similar to those described in Embodiment 1, the description thereof is omitted.

When there is a change request of the display area from the terminal device, the CPU 211 of the remote display device 200 may set the changed display area, and it may then determine whether the changed display area meets a given exception condition (Step S321). The exception condition may include the changed display area being magnified by a given magnification ratio or more from the display area before the change, the changed display area being reduced by a given magnification ratio or less from the display area before the change, and the changed display area including the outside of the display screen displayed on the remote display device 200. If the changed display area meets the exception condition (YES at Step S321), the CPU 211 may read the nautical chart data 251 at the position set for the display area from the memory 205, instead of copying the image of a part of the display screen (Step S322). When the changed display area is magnified by the given magnification ratio or more from the display area before the change, the nautical chart data of a large magnification ratio may be read, and when the changed display area is reduced by the given magnification ratio or less from the display area before the change, the nautical chart data of a low magnification ratio may be read. The nautical chart of the large magnification ratio may be higher in the resolution than the nautical chart displayed on the remote display device 200, and the nautical chart of the low magnification ratio may be lower in the resolution than the nautical chart displayed on the remote display device 200. Therefore, the nautical chart of suitable resolution can be displayed on the terminal device 300 according to the size change of the nautical chart. Moreover, when the changed display area includes the outside of the display screen displayed on the remote display device 200, the nautical chart data of a range including the outside of the nautical chart displayed on the remote display device 200 may be read.

The CPU 211 may then generate the display data including the read nautical chart and the route in this part (Step S323). Here, when the changed display area includes the outside of the display screen of the remote display device 200, the display data which is the image to which the boundary information indicative of the boundary of the display range of the remote display device 200 is added to the nautical chart may be generated, similar to Embodiment 2. When the display data is generated, the CPU 211 may transit the processing to Step S129, where it transmits the generated display data to the terminal device (Step S129). Note that since processings at Steps S130 to S132 are similar to those described in Embodiment 1, the description thereof is omitted.

Embodiment 4

Figure 17:
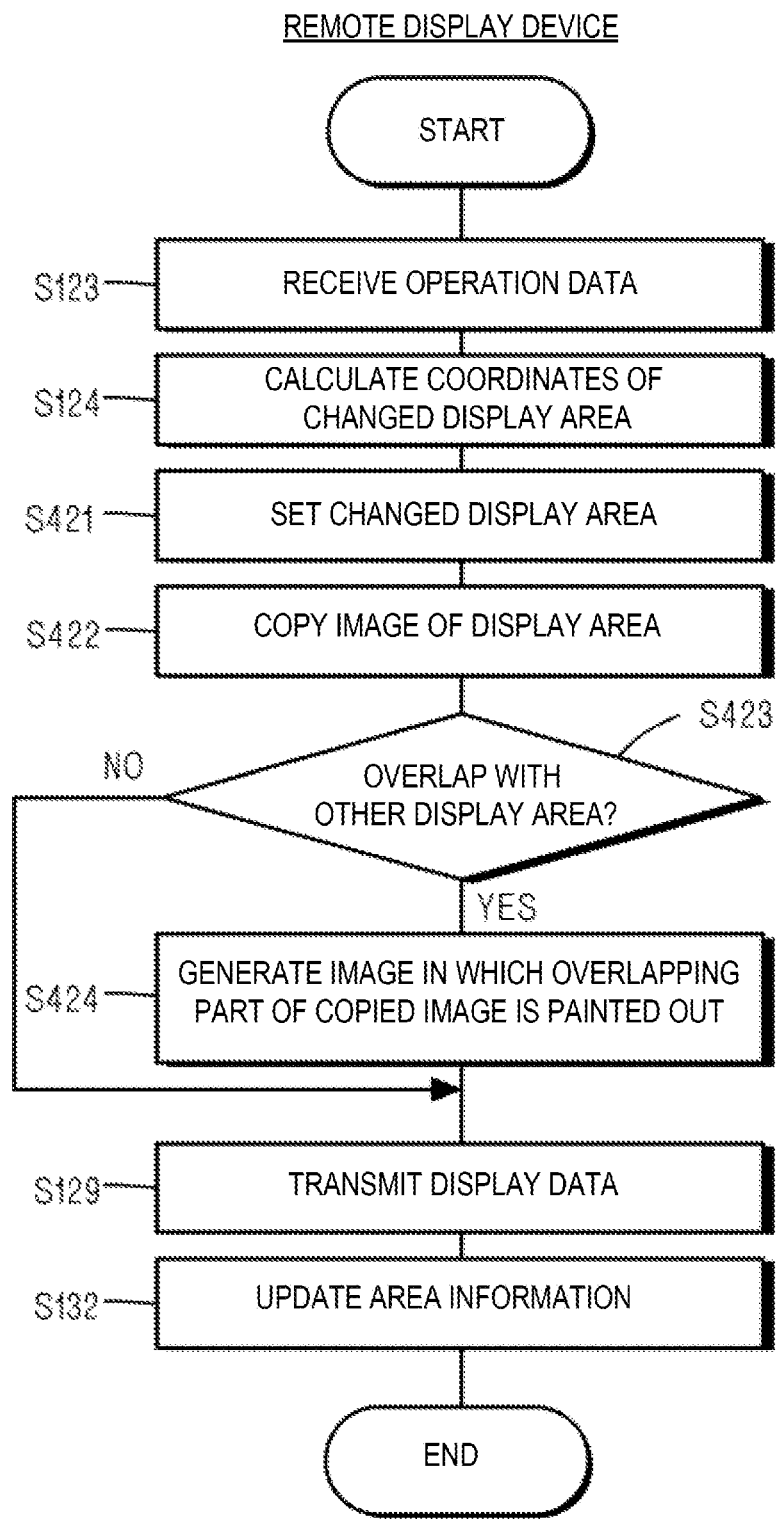
FIG. 17 is a flowchart illustrating a display area change procedure of a remote display device according to Embodiment 4.

In this embodiment when the display area of one terminal device and the display area of the other terminal device overlap with each other, the remote display device which is the electronic nautical chart display module may display on one terminal device an image of its display area, and display other parts on the other terminal device without displaying the part of its display area overlapping with the display area of one terminal device.
<Configuration of Remote Display System>
Since the configurations of the remote display system according to this embodiment are similar to the configuration of the remote display system 100 according to Embodiment 1, the same components are denoted with the same reference characters to omit the description thereof.
<Operation of Remote Display System>
Operation of the remote display system 100 according to this embodiment is described. Note that since the login, the route creation/correction, the voice call, and the logout are similar to those described in Embodiment 1, the description thereof is omitted.
[Display Area Change]
A display area change executed by the remote display system 100 according to this embodiment is described. FIG. 17 is a flowchart illustrating a display area change procedure of the remote display device 200 according to this embodiment. Since processings at Steps S121 to S124 are similar to those described in Embodiment 1, the description thereof is omitted.

Figure 18:
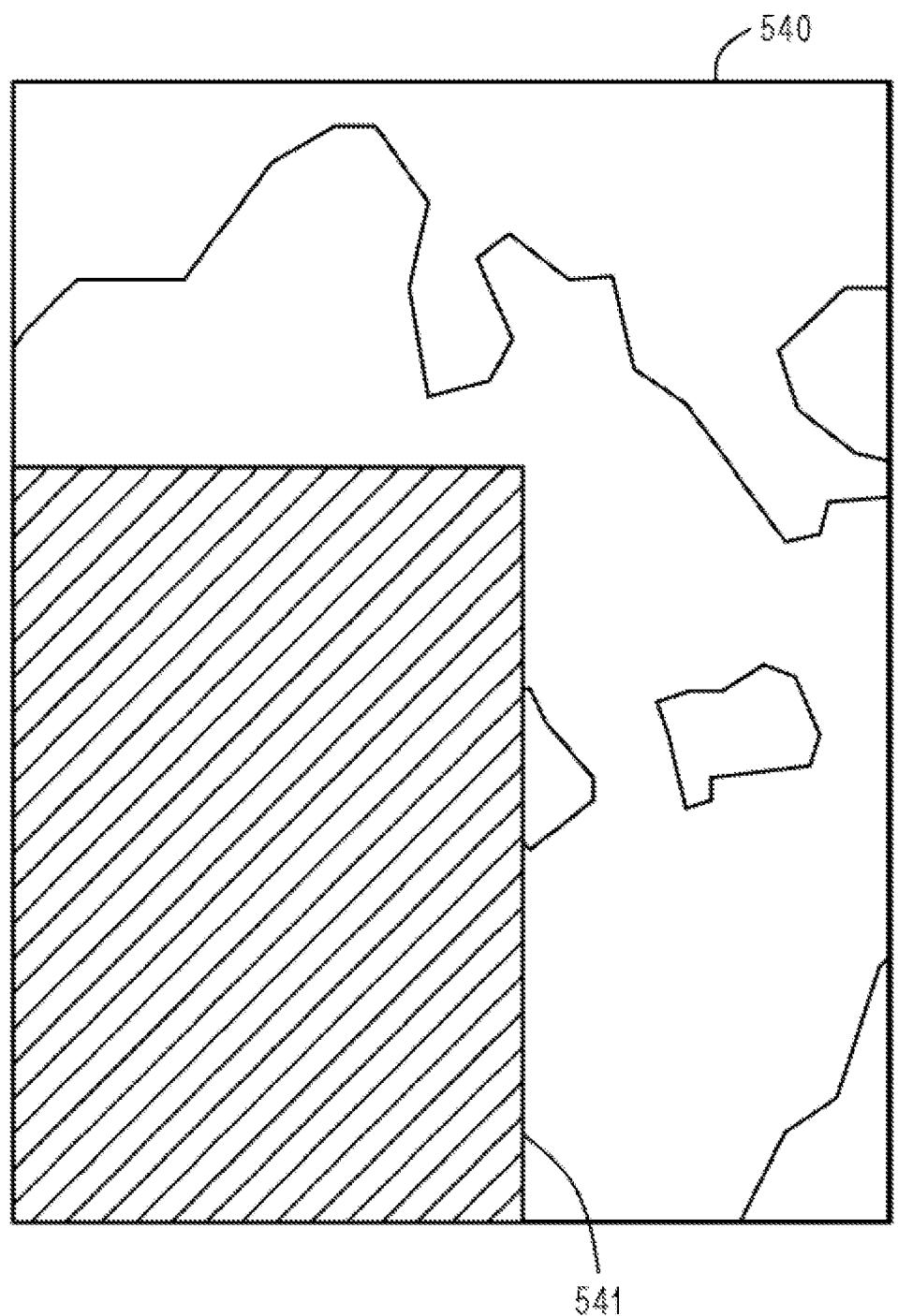
FIG. 18 is a view illustrating one example of a display image of the terminal device having a no-display area.

The CPU 211 of the remote display device 200 may calculate coordinates of the changed display area, then set this display area as a new display area (Step S421), and copy an image in the set display area from the display screen (Step S422). Next, the CPU 211 may determine whether the set display area overlaps with the display areas of the other terminal devices 300 (Step S423). If the display area does not overlap (NO at Step S423), the CPU 211 may transit the processing to Step S129, where it transmits to the terminal device 300 the display data which is the copy image. On the other hand, if the display area overlaps (YES at Step S423), the CPU 211 may generate an image in which a part of the copied image overlapping with other display areas is replaced by a specific single color (e.g., black), i.e., an image where the overlapping part is painted out, and use this image as the display data (Step S424). The CPU 211 may then transit the processing to Step S129, where it transmits to the terminal device 300 the display data which is an image where a part thereof is replaced by monochrome (hereinafter, this part is referred to as a "no-display area"). Note that since processings at Steps S130 to S132 are similar to those described in Embodiment 1, the description thereof is omitted. FIG. 18 is a view illustrating one example of the display image of the terminal device 300 having the no-display area. As illustrated in FIG. 18, a no-display area 541 may be provided to a display image 540 of the terminal device 300. The no-display area 541 may be an area displayed on another terminal device 300, and therefore, the user of the terminal device 300 can recognize that this area overlaps with the display area of another terminal device 300 by confirming this no-display area 541. Moreover, since no route is displayed in the no-display area 541, it can be prevented that the user edits the route displayed on the other terminal devices 300.

Embodiment 5

Figure 19:
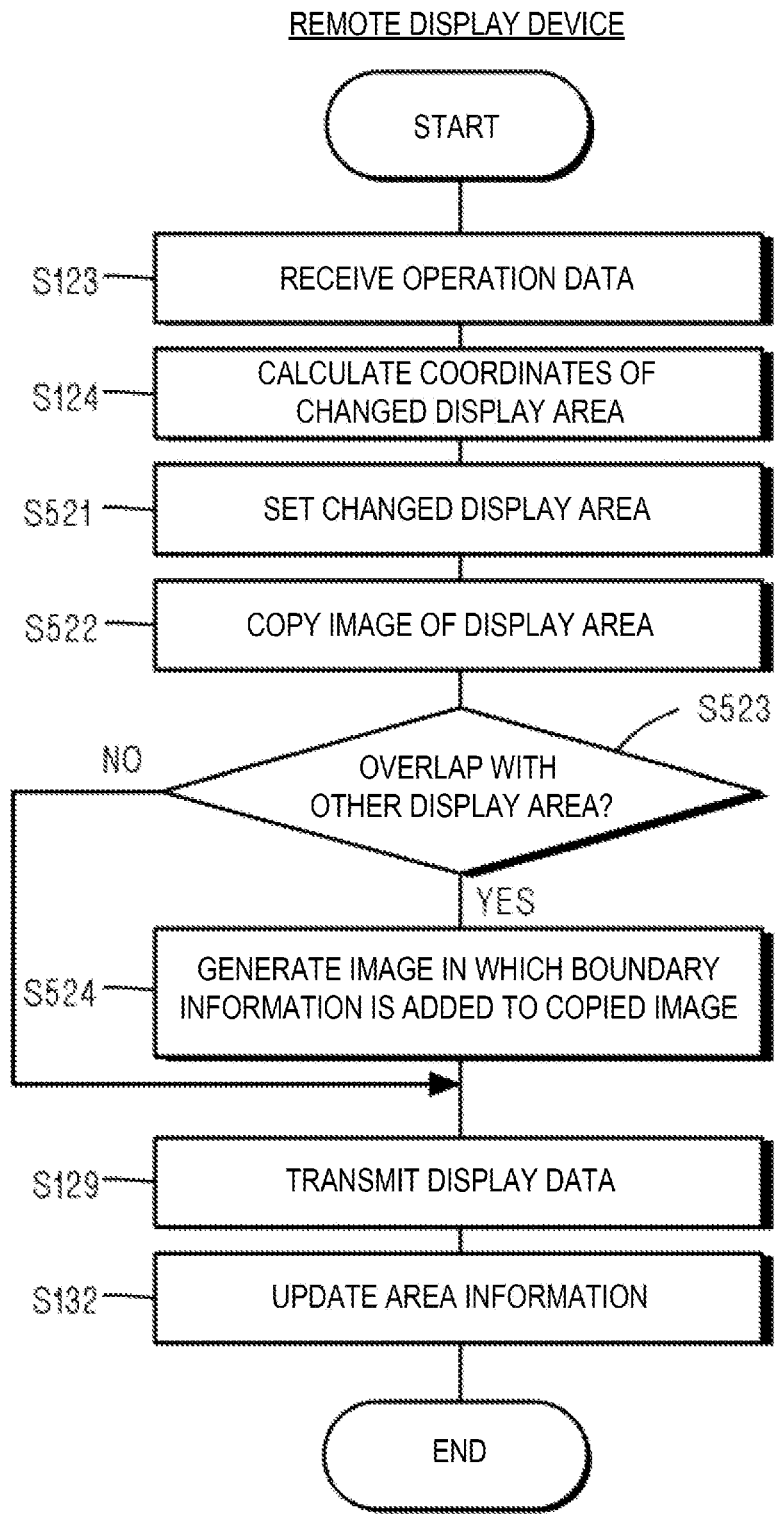
FIG. 19 is a flowchart illustrating a display area change procedure of a remote display device according to Embodiment 5.

In this embodiment when the display area of one terminal device and the display area of the other terminal device overlap with each other, the remote display device which is the electronic nautical chart display module may display the image of the display area on both the terminal devices. Moreover, when operations of a route are performed in a plurality of terminal devices of which the display areas are overlapped, an operation from one terminal device may be executed while operations from the other terminal devices are not executed.
<Configuration of Remote Display System>
Since the configurations of the remote display system according to this embodiment are similar to the configuration of the remote display system 100 according to Embodiment 1, the same components are denoted with the same reference characters to omit the description thereof.
<Operation of Remote Display System>
Operation of the remote display system 100 according to this embodiment is described. Note that since the login, the voice call, and the logout are similar to those described in Embodiment 1, the description thereof is omitted.
[Display Area Change]
A display area change executed by the remote display system 100 according to this embodiment is described. FIG. 19 is a flowchart illustrating a display area change procedure of the remote display device 200 according to this embodiment. Since processings at Steps S121 to S124 are similar to those described in Embodiment 1, the description thereof is omitted.

Figure 20:
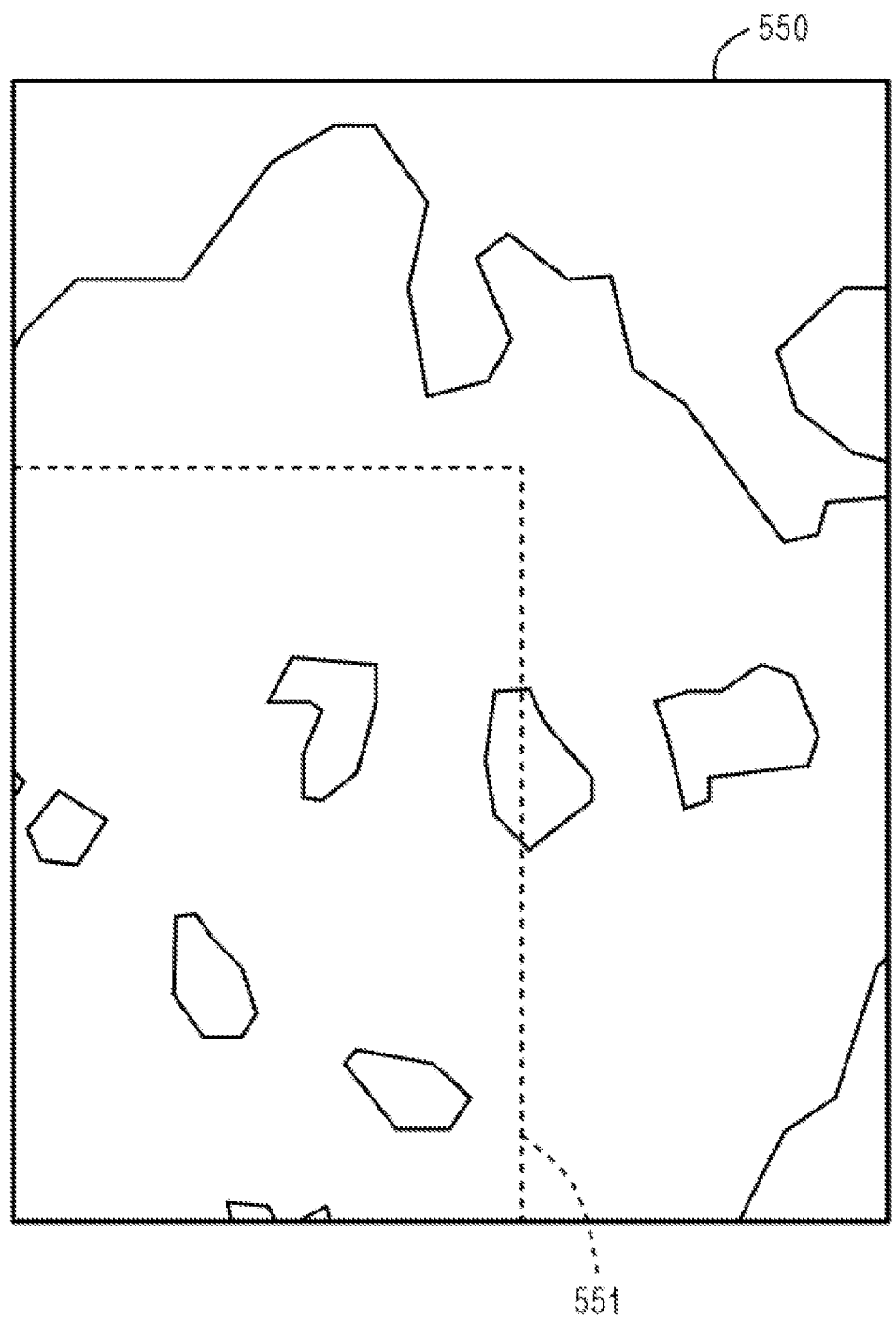
FIG. 20 is a view illustrating one example of an image of a display area to which the boundary information is added.

The CPU 211 of the remote display device 200 may calculate coordinates of the changed display area, then set this display area as a new display area (Step S521), and copy the image in the set display area from the display screen (Step S522). Next, the CPU 211 may determine whether the set display area overlaps with the display areas of the other terminal devices 300 (Step S523). If the display area does not overlap (NO at Step S523), the CPU 211 may transit the processing to Step S129, where it transmits the display data which is a copy image to the terminal device 300. On the other hand, if the display area overlaps (YES at Step S523), the CPU 211 may generate an image where boundary information indicative of a boundary with another display area is added to the copied image, and use this image as the display data (Step S524). The CPU 211 may then transit the processing to Step S129, where it transmits to the terminal device 300 the display data which is an image where the boundary information is added. Note that since processings at Steps S130 to S132 are similar to those described in Embodiment 1, the description thereof is omitted. FIG. 20 is a view illustrating one example of the image of the display area to which the boundary information is added. As illustrated in FIG. 20, boundary information 551 may be added to a display image 550 of the terminal device 300. By adding the boundary information 551, the user of the terminal device 300 can recognize that the display area of the terminal device 300 overlaps with the display area of another terminal device 300. Moreover, if the display areas of a plurality of terminal devices 300 overlap, an operation of a route in the overlapped area may be restricted as will be described later. Therefore, by displaying the boundary information 551, the user can recognize that the operation of the route in the area defined by the boundary information 551 may be restricted.

[Route Creation/Correction]

Next, a route creation/correction of the remote display system 100 according to this embodiment is described. In this embodiment, if the display areas of the plurality of terminal devices 300 overlap with each other, as for the route included in the overlapping area (hereinafter, referred to as a "display overlap area"), a creation or correction by the user who first instructed the creation or correction of the route may be permitted, and creations or corrections of the route by other users may not be permitted. Below, the route creation/correction is described in detail.

Figure 21:
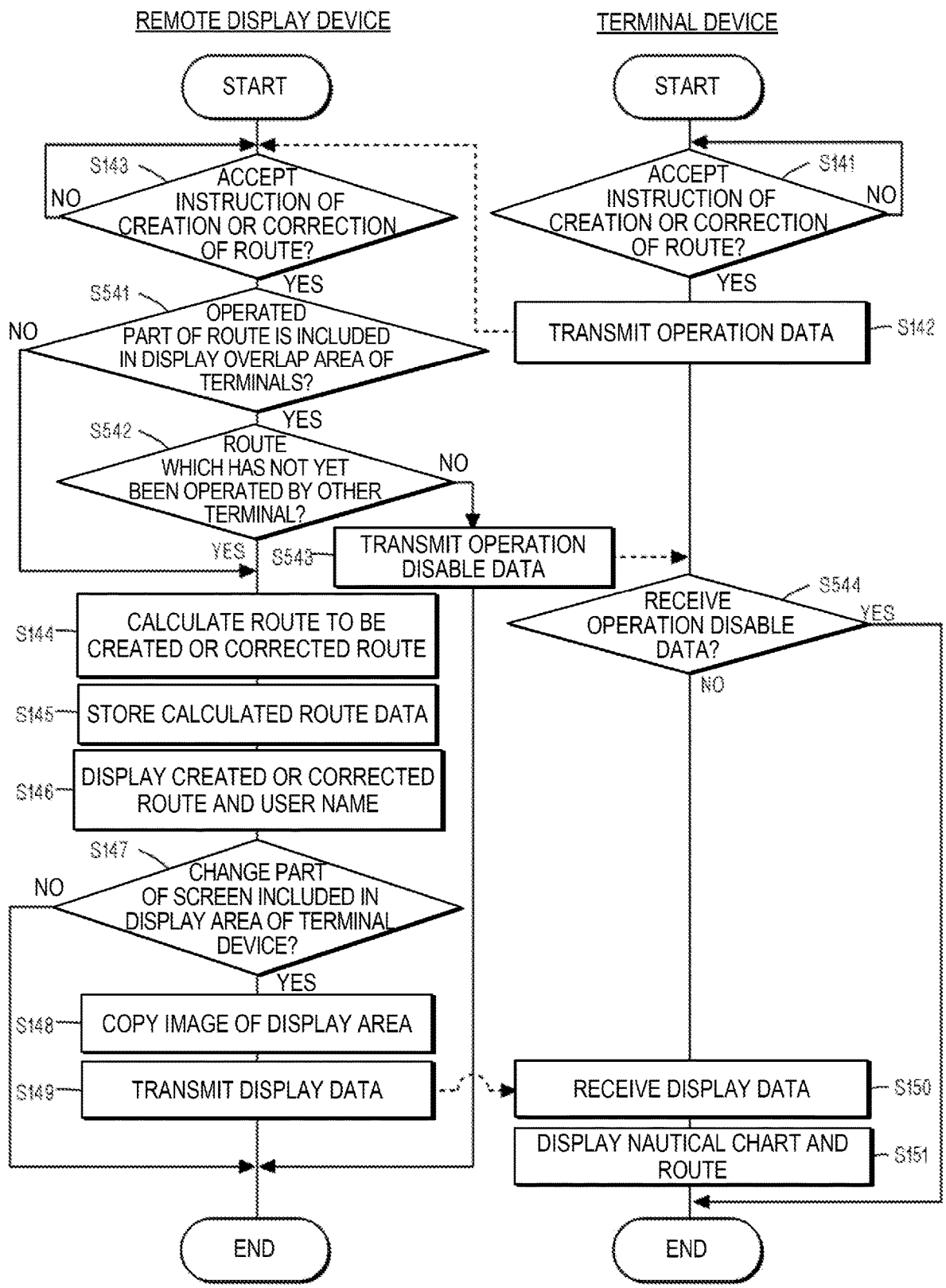
FIG. 21 is a flowchart illustrating a route creation/correction procedure of a remote display system according to Embodiment 5.

FIG. 21 is a flowchart illustrating a route creation/correction procedure of the remote display system 100 according to this embodiment. Since processings at Steps S141 to S143 are similar to those described in Embodiment 1, the description thereof is omitted.

If an operation of instructing a creation or correction of a route is given to any of the remote display device 200 and the terminal device 300 (YES at Step S143), the CPU 211 may determine whether the operated part of the route, i.e., a part where the creation or correction of the route is instructed, is included in the display overlap area of the plurality of terminal devices 300 (Step S541). If the operated part of the route is not included in the display overlap area (NO at Step S541), the CPU 211 may transit the processing to Step S144. On the other hand, if the operated part of the route is included in the display overlap area (YES at Step S541), the CPU 211 may determine whether the route included in this display overlap area is a route which has not yet been operated by other terminal devices 300 (Step S542).

If the route is a route which has not yet been operated by other terminal devices 300 (YES at Step S542), the CPU 211 may transit the processing to Step S144. Therefore, for the route included in the display overlap area, the creation or correction by the user who first instructed the creation or correction of the route may be permitted. Note that since processings at Steps S144 to S151 are similar to those described in Embodiment 1, the description thereof is omitted.

On the other hand, if the route is a route which has already been operated by another terminal device 300 (NO at Step S542), the CPU 211 may transmit operation disable data indicative of a refusal of the operation to the terminal device 300 which is a transmission source of the operation data (Step S543), and end the processing. The CPU 311 of the terminal device 300 may determine whether the operation disable data is received (Step S544). If the operation disable data is not received (NO at Step S544), the CPU 311 may transit the processing to Step S150. On the other hand, if the operation disable data is received, the CPU 311 may end the processing. Therefore, for the route included in the display overlap area, the creations or corrections by users, other than the user who first instructed the creation or correction of the route, may be refused.

Embodiment 6

In this embodiment, when the display area of one terminal device and the display area of the other terminal device overlap with each other, the remote display device which is the electronic nautical chart display module may display the image of the display area on both the terminal devices. Moreover, when operations of a route of a plurality of terminal devices of which the display area are overlapped with each other compete, the remote display device may instruct a negotiation to each of the plurality of terminal devices, execute an operation from the terminal device to which the authorization is given as a result of the negotiation, and may not execute operations from other terminal devices.

<Configuration of Remote Display System>

Since the configurations of the remote display system according to this embodiment are similar to the configuration of the remote display system 100 according to Embodiment 1, the same components are denoted with the same reference characters to omit the description thereof.

<Operation of Remote Display System>

Operation of the remote display system 100 according to this embodiment is described. Note that since the login, the voice call, and the logout are similar to those described in Embodiment 1, the description thereof is omitted. Moreover, since the display area change is similar to that described in Embodiment 5, the description thereof is omitted.

[Route Creation/Correction]

Figure 22A:
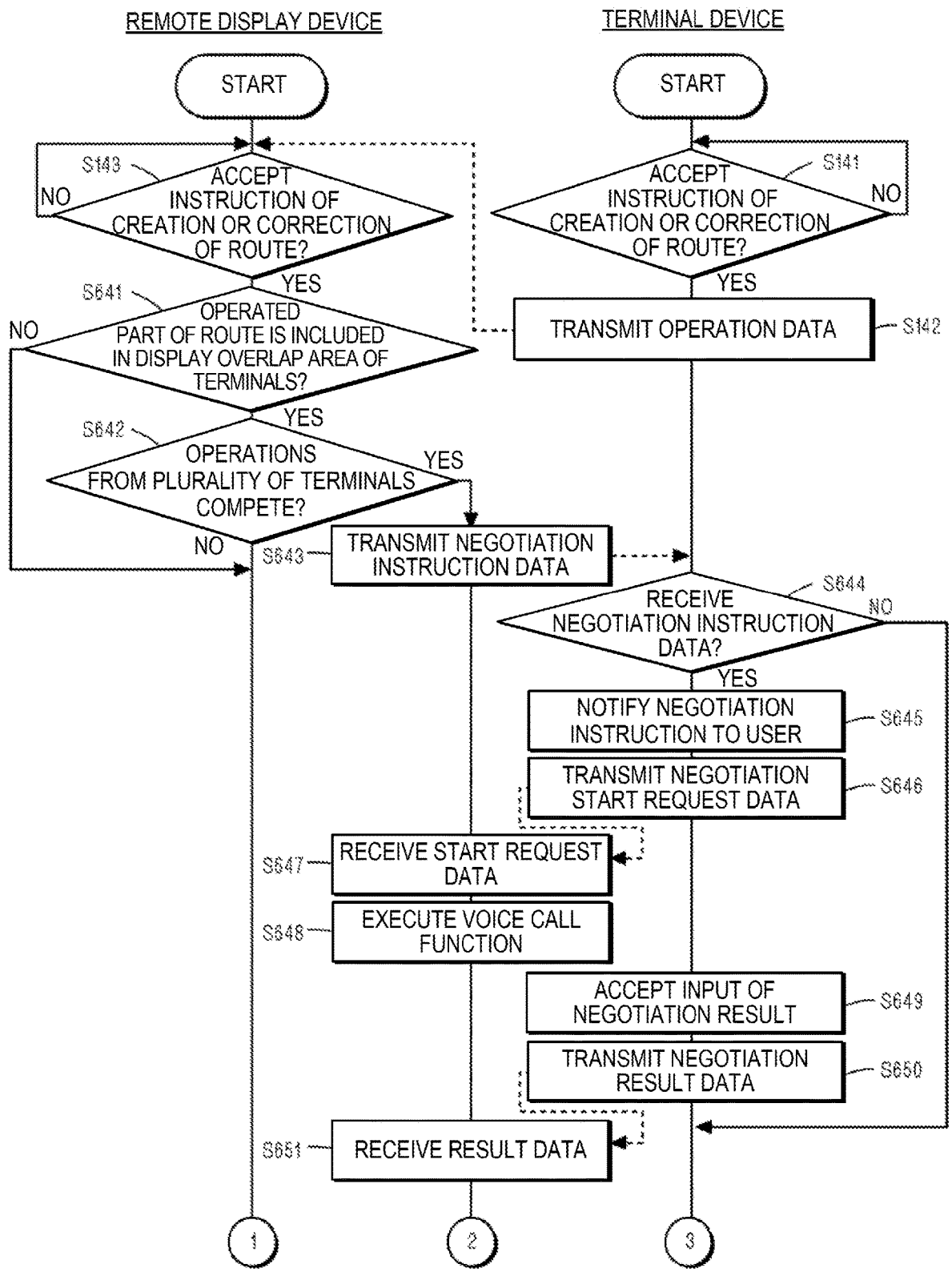
FIG. 22A is a flowchart illustrating a route creation/correction procedure of a remote display system according to Embodiment 6 (1/2)
Figure 22B:
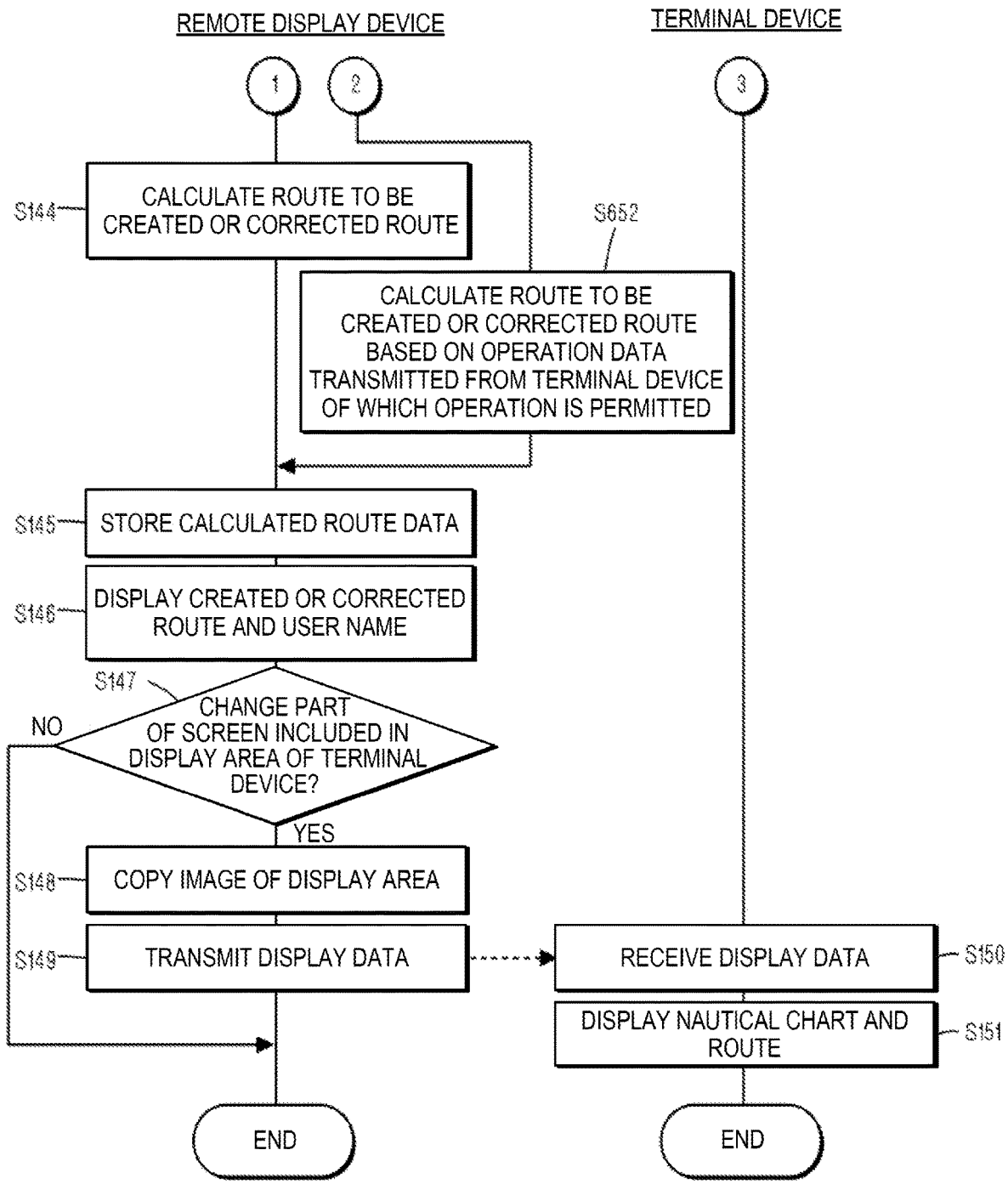
FIG. 22B is a flowchart illustrating the route creation/correction procedure of the remote display system according to Embodiment 6 (2/2)

A route creation/correction of the remote display system 100 according to this embodiment is described. FIGS. 22A and 22B illustrate a flowchart of a route creation/correction procedure of the remote display system 100 according to this embodiment. Since processings at Steps S141 to S143 are similar to those described in Embodiment 1, the description thereof is omitted.

If an operation of instructing a creation or correction of a route is given to any of the remote display device 200 and the terminal device 300 (YES at Step S143), the CPU 211 may determine whether the operated part of the route, i.e., the part where the creation or correction of the route is instructed, is included in the display overlap area of the plurality of terminal devices 300 (Step S641). If the operated part of the route is not included in the display overlap area (NO at Step S641), the CPU 211 may transit the processing to Step S144. On the other hand, if the operated part of the route is included in the display overlap area (YES at Step S641), the CPU 211 may determine whether the operation data is accepted from the plurality of terminal devices 300 for the route included in the display overlap area, i.e., whether operations of the route from the plurality of terminal devices 300 compete (Step S642). If the operations do not compete (NO at Step S642), the CPU 211 may transit the processing to Step S144. Therefore, for the route included in the display overlap area, if the operations do not compete among the plurality of terminal devices 300, the operation of the route may be executed without the restriction. Note that since processings at Steps S144 to S151 are similar to those described in Embodiment 1, the description thereof is omitted.

On the other hand, if the operations compete among the plurality of terminal devices 300 for the route (YES at Step S642), the CPU 211 may transmit negotiation instruction data which instructs a negotiation between the users who operate the terminal devices 300 (Step S643). The CPU 311 of the terminal device 300 may determine whether the negotiation instruction data is received (Step S644), and if the negotiation instruction data is not received (NO at Step S644), the CPU 311 may transit the processing to Step S150. On the other hand, if the negotiation instruction data is received, the CPU 311 may display notifying information which notifies that the negotiation between the users is instructed (Step S645) to urge the users to start the negotiation. This notifying information may include the user names of the users who need to negotiate, i.e., the user names of the users of which the operations compete. When the user recognizes that there is the negotiation instruction by the notifying information, he/she may give to the input part 302 an operation of requiring a start of the negotiation to each of other users who need to negotiate. When this operation is accepted, the CPU 311 may transmit start request data which requests the start of the negotiation to the remote display device 200 (Step S646). If the start request data is received from all the required terminal devices 300 which need to negotiate (Step S647), the CPU 211 of the remote display device 200 may execute the voice call function between these terminal devices 300 (Step S648). Therefore, the negotiations may be performed among these users.

The users may decide, by the negotiations, one user (one terminal device 300) who is permitted for the operation. After the negotiations are finished, the user may give a result of the negotiations to the input part 302. When the input of the result of the negotiations is accepted (Step S649), the CPU 311 of the terminal device 300 may transmit result data indicative of the result of the negotiations to the remote display device 200 (Step S650). When the result data of the negotiations is received (Step S651), the CPU 211 of the remote display device 200 may execute the operation of the route based on the operation data transmitted from the terminal device 300 of which the operation is permitted, i.e., calculate a route to be created or corrected route based on the operation data (Step S652). Here, the calculation of the route may not be executed based on the operation data transmitted from the terminal device 300 of which the operation is not permitted, i.e., the terminal device 300 of which the operation is not permitted as the result of the negotiations. The CPU 211 may then transit the processing to Step S145.

Embodiment 7

In this embodiment, when the display area of one terminal device and the display area of the other terminal device overlap with each other, the remote display device which is the electronic nautical chart display module may display the image of the display area on both the terminal devices. Moreover, the remote display device may set an operational authority of a route for every user by several levels, execute an operation of the route by the user who has the authority, and may not execute an operation of the route by the user who does not have the authority. Moreover, when operations of a route compete between the plurality of terminal devices of which the display areas are overlapped with each other, the remote display device may determine the level of the operational authority for every user, execute an operation of the route by the user with the highest level of operational authority, and may not execute operations of the route by other users.

<Configuration of Remote Display System>

Figure 23:
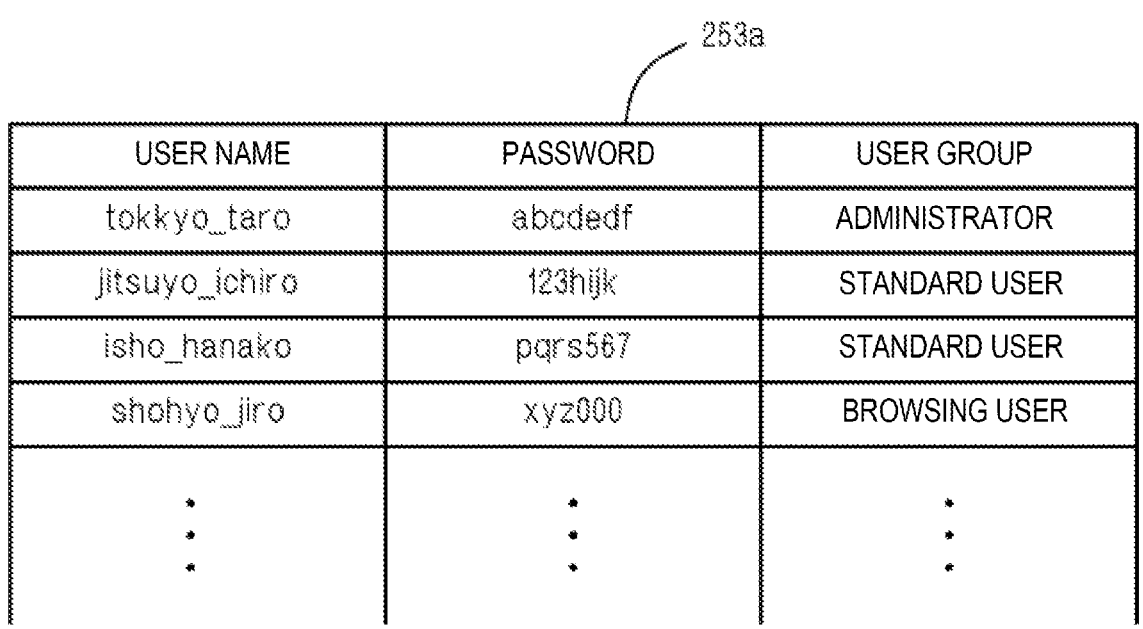
FIG. 23 is a view schematically illustrating a structure of a user management database according to Embodiment 7.

The remote display device according to this embodiment may store in the memory 205 a user management DB 253a which sets the operational authority of a route for every user. FIG. 23 is a view schematically illustrating a structure of the user management DB 253a. The user management DB 253a may store, for every user, a user name, a password, and a user group so as to be associated with each other. The user group may be provided with an administrator, a standard user, and a browsing user, and the access authority to the route data 252 may be set to each member. The level of the access authority may be the highest for the administrator, the second highest for the standard user, and the lowest for the browsing user. The authority of displaying and operating a route may be given to the administrator. That is, the user of the administrator can read the route data 252 and display a route on the remote display device 200 and the terminal devices 300, and can operate a route, i.e., can create or correct a route and store the created or corrected route data 252 in the memory 205. The access authority with no restriction to all the route data 252 may be given to the administrator. That is, the administrator may be capable of displaying or operating the route data of which display or operation is prohibited. Although the operational authority of reading out of the route data 252 and operation of a route is given to the standard user similar to the administrator, access to a part of the route data 252 may be restricted. That is, the display or operation may be prohibited for the route data of which the display or operation is prohibited. Moreover, when operations of the route at the same part compete between the administrator and the standard user, the operation of the administrator may be executed and the operation of the standard user may not be executed. Moreover, although the display authority of a route is given to the browsing user, the operational authority may not be given. Since other configurations of the remote display system according to this embodiment are similar to the configurations of the remote display system 100 according to Embodiment 1, the same components are denoted with the same reference characters to omit the description thereof.

<Operation of Remote Display System>

Operation of the remote display system 100 according to this embodiment is described. Note that since the login, the voice call, and the logout are similar to those described in Embodiment 1, the description thereof is omitted. Moreover, since the display area change is similar to that described in Embodiment 5, the description thereof is omitted.

[Route Creation/Correction]

Figure 24A:
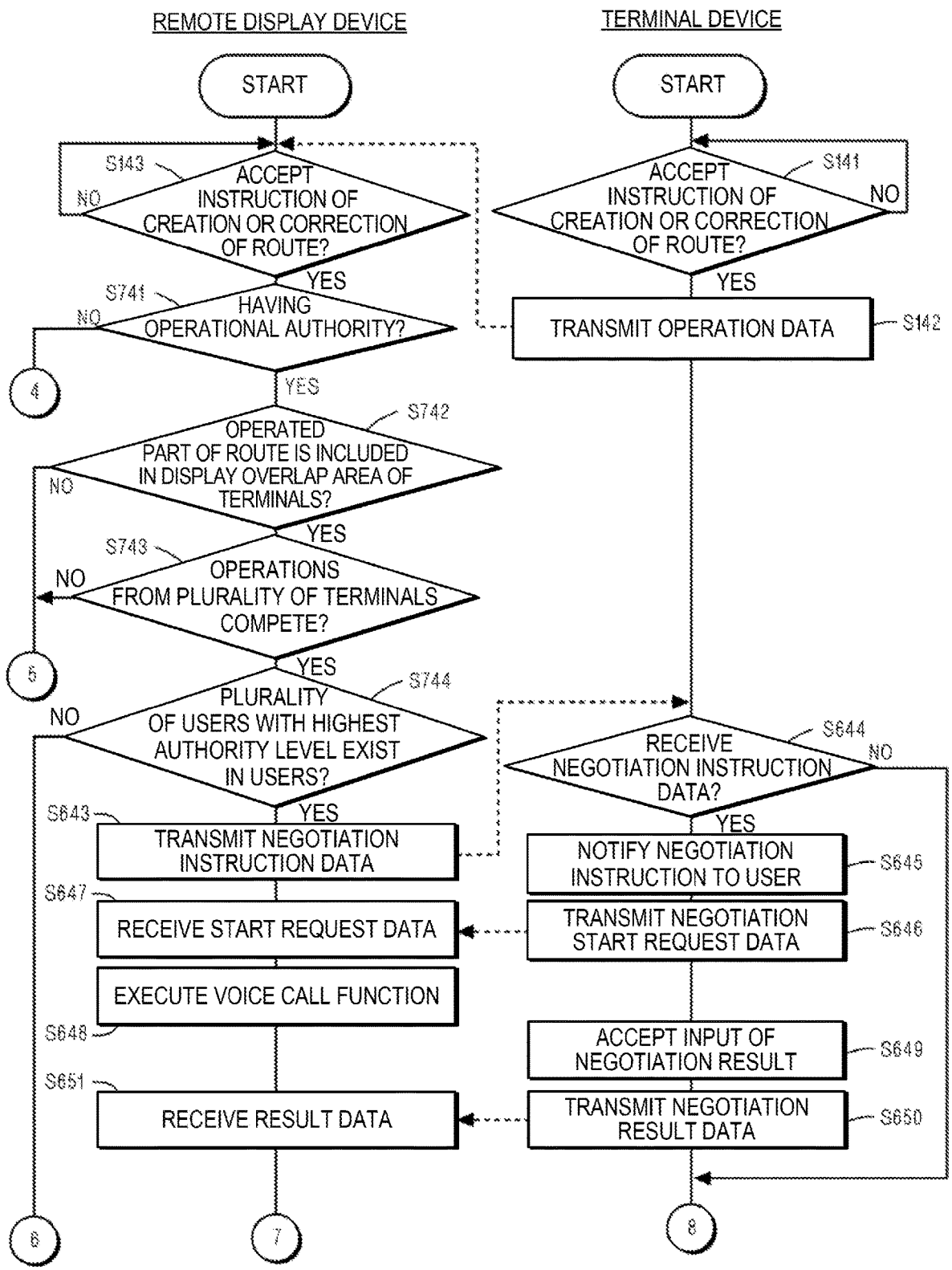
FIG. 24A is a flowchart illustrating a route creation/correction procedure of a remote display system according to Embodiment 7 (1/2)
Figure 24B:
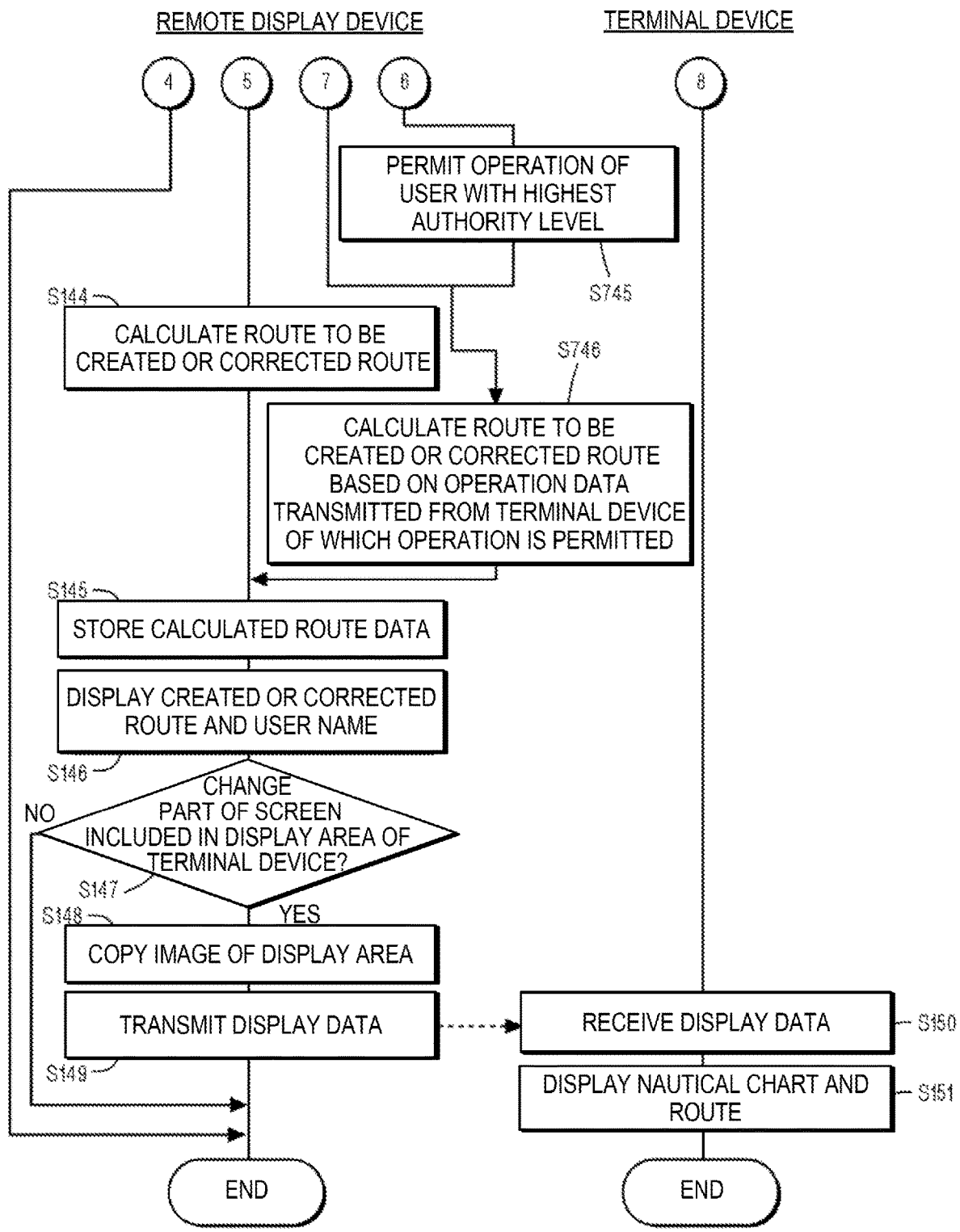
FIG. 24B is a flowchart illustrating the route creation/correction procedure of the remote display system according to Embodiment 7 (2/2)

A route creation/correction of the remote display system 100 according to this embodiment is described. FIGS. 24A and 24B are flowcharts illustrating a route creation/correction procedure of the remote display system 100 according to this embodiment. Since processings at Steps S141 to S143 are similar to those described in Embodiment 1, the description thereof is omitted.

If an operation of instructing a creation or correction of a route is given to any of the remote display device 200 and the terminal device 300 (YES at Step S143), the CPU 211 may determine whether the user who performed the operational instruction has the operational authority of a route, i.e., whether the user is the administrator or the standard user (Step S741). If the user does not have the operational authority of a route (NO at Step S741), the CPU 211 may end the processing. Therefore, the creation or correction of a route by the browsing user may not be executed.

On the other hand, if the user has the operational authority of a route (YES at Step S741), the CPU 211 may determine whether the operated part of the route, i.e., the part where the creation or correction of the route is instructed, is included in the display overlap area of the plurality of terminal devices 300 (Step S742). If the operated part of the route is not included in the display overlap area (NO at Step S742), the CPU 211 may transit the processing to Step S144. On the other hand, if the operated part of the route is included in the display overlap area (YES at Step S742), the CPU 211 may determine for this route included in the display overlap area whether the operation data is accepted from the plurality of terminal devices 300, i.e., whether the operations of the route from the plurality of terminal devices 300 compete (Step S743). If the operations do not compete (NO at Step S743), the CPU 211 may transit the processing to Step S144. Therefore, for the route included in the display overlap area, if the operations do not compete between the plurality of terminal devices 300, the operation of a route may be executed without any restrictions. Note that since processings at Steps S144 to S151 are similar to those described in Embodiment 1, the description thereof is omitted.

On the other hand, if the operations for the route compete between the plurality of terminal devices 300 (YES at Step S743), the CPU 211 may determine the operational authority of respective users whose operations of the route compete, and determine whether a plurality of users with the highest level of operational authority exist in the users (Step S744). For example, when the administrator and the standard user are included in the users whose operations compete, the administrator may be the highest level of operational authority between the users. Therefore, in this case, at Step S744, the CPU 211 may determine whether a plurality of administrators are included in the users whose operations compete. Moreover, if the users whose operations compete are only the standard users, the standard user may be the highest level of operational authority between the users. Therefore, in this case, at Step S744, the CPU 211 may determine whether a plurality of standard users are included in the users whose operations compete. If the plurality of users with the highest level of operational authority do not exist between the users, i.e., if only one user with the highest level of operational authority exists between the users (NO at Step S744), the CPU 211 may select the user with the highest level of operational authority and permit the operation of this user (Step S745). Next, the CPU 211 may execute the operation of the route based on the operation data transmitted from the terminal device 300 used by the user to whom the operation is permitted, i.e., calculate the route to be created or corrected route based on this operation data (Step S746). Here, the calculation of a route may not be executed depending on the operation data transmitted from the terminal device 300 of which the operation is not permitted, i.e., the terminal device 300 used by the user with a low level of operational authority. The CPU 211 may then transit the processing to Step S145. By such a processing, when the operations compete between the administrator with a high level of operational authority and the standard user with a low level of operational authority, the operation of the administrator may be executed and the operation of the standard user may not be executed.

On the other hand, if a plurality of users with the highest level of operational authority exist between the users (YES at Step S744), the CPU 211 may transit the processing to Step S643, where it instructs a negotiation between these users. Note that since processings of Steps S643 to S651 are similar to those described in Embodiment 6, the description thereof is omitted. Therefore, for example, when the competition of the operations occurs only between a plurality of standard users, negotiations may be performed between these standard users, and the operation by one user selected by the negotiations may be permitted, and the operations by other users may not be permitted. The CPU 211 of the remote display device 200 may execute the operation of the route based on the operation data transmitted from the terminal device 300 used by the user to whom the operation is permitted, i.e., calculate the route to be created or corrected route based on this operation data (Step S746). Here, the calculation of the route may not be executed depending on the operation data transmitted from the terminal device 300 of which the operation is not permitted, i.e., the terminal device 300 of which the operation is not permitted as a result of the negotiations. The CPU 211 may then transit the processing to Step S145.

Embodiment 8

In this embodiment, mutually different display areas of a display screen of a remote display device which is an electronic blackboard device may be displayed on a plurality of terminal devices. A teacher (lecturer) may specify a display area of the terminal device for students (participants) in the display screen of the electronic blackboard device, and an image of the specified display area may be displayed on the terminal device.

<Configuration of Remote Display System>

Figure 25:
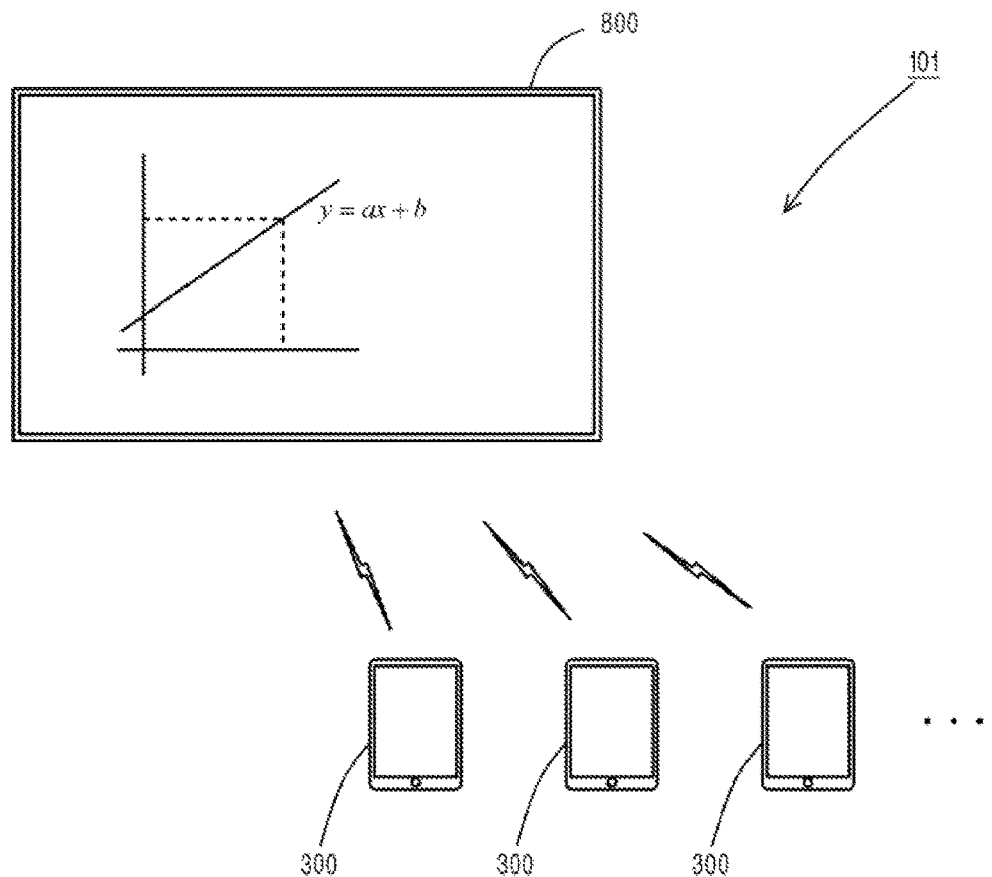
FIG. 25 is a view schematically illustrating a configuration of a remote display system according to Embodiment 8.

FIG. 25 is a view schematically illustrating a configuration of a remote display system according to this embodiment. As illustrated in FIG. 25, the remote display system 101 may include a remote display device 800 and a plurality of terminal devices 300. The remote display device 800 may be an electronic blackboard device used for a lesson, a lecture, training, etc. The remote display device 800 can accept an input of teaching information for a lecturer, such as a teacher, to teach participants, such as children and students, and display this teaching information. In this embodiment, a case where the remote display system 101 is used for the lesson which the teacher performs to the students is described. The electronic blackboard device may be installed in a classroom where the lesson takes place. The remote display device 800 may be installed by hanging on a wall of the classroom, and it may have a large-sized screen in its principal surface in order to allow a plurality of students to view the teaching information simultaneously.

Moreover, since the terminal devices 300 are similar to those described in Embodiment 1, the description thereof is omitted. The remote display device 800 and each terminal device 300 may be possible to wirelessly communicate with each other.

Figure 26:
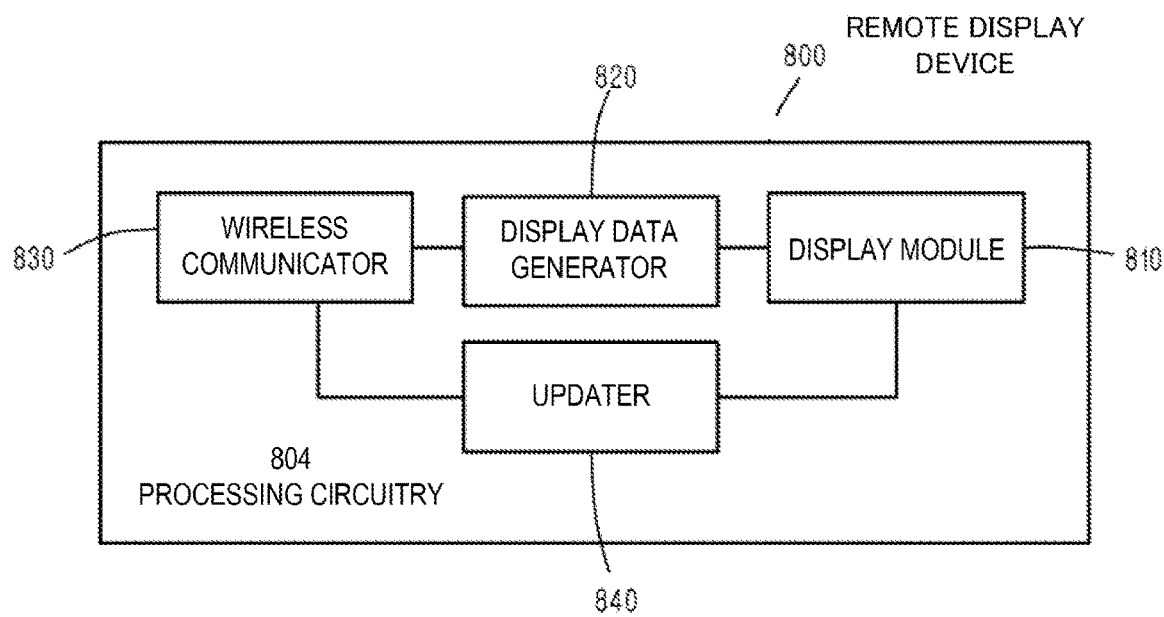
FIG. 26 is a functional block diagram illustrating a functional configuration of a remote display device according to Embodiment 8.

FIG. 26 is a functional block diagram illustrating a functional configuration of the remote display device 800. The remote display device 800 may have a wireless communication function by using a wireless LAN. As illustrated in FIG. 26, the remote display device 800 may have functional blocks of a display module 810, a display data generator 820, a wireless communicator 830, and an updater 840. The display data generator 820 may generate a plurality of display data corresponding to different display areas which are parts of a display screen displayed on the display module 810. The wireless communicator 830 may perform wireless communications with the terminal devices 300 through the wireless LAN, and transmit a plurality of display data generated by the display data generator 820 to the respective terminal devices 300. Moreover, the wireless communicator 830 may receive operation data indicative of an operation performed to the display area from the terminal device 300. The updater 840 may update the display screen of the display module 810 based on the operation data received by the wireless communicator 830.

Figure 27:
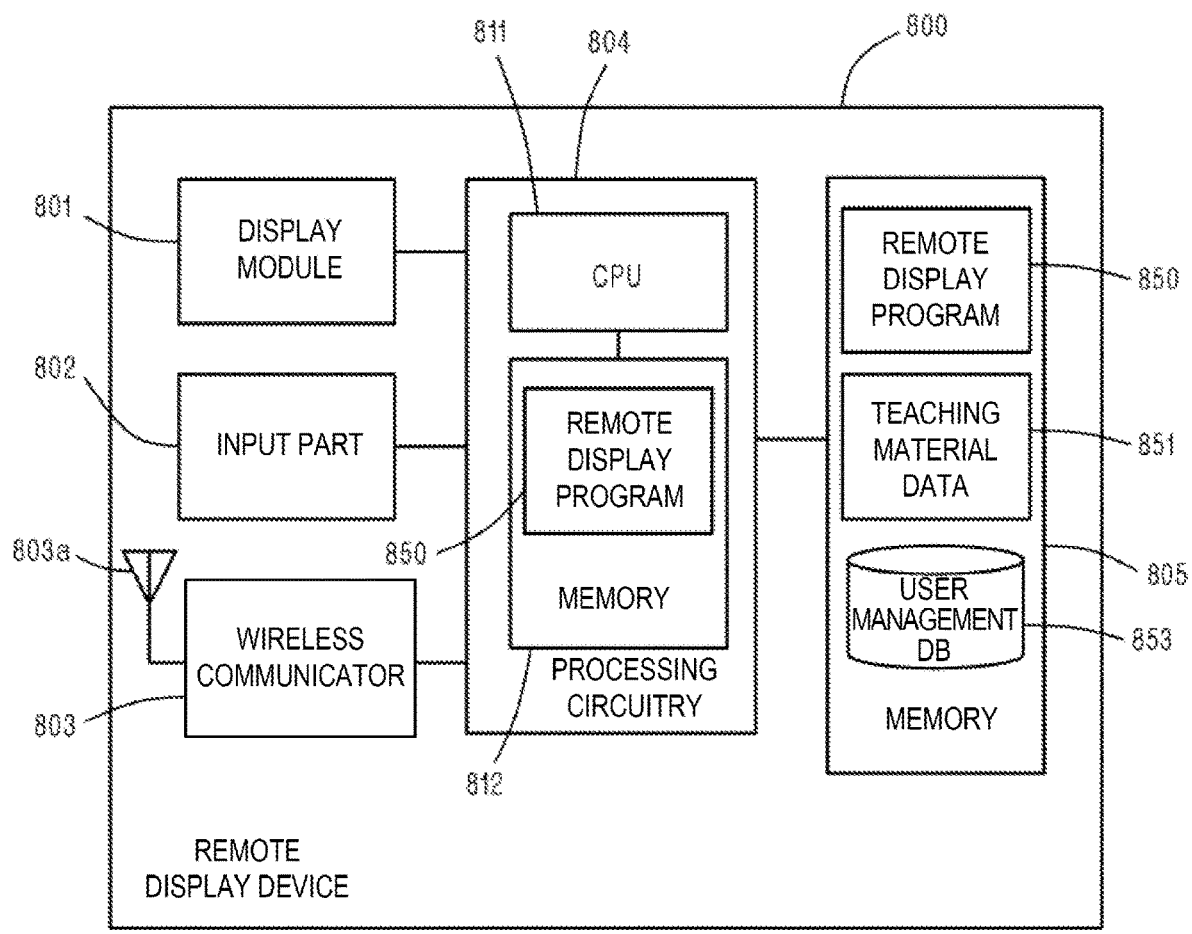
FIG. 27 is a block diagram illustrating one example of a hardware configuration of the remote display device according to Embodiment 8.

FIG. 27 is a block diagram of the remote display device 800 illustrating one example of a concrete hardware configuration. The remote display device 800 may include a display module 801, an input part 802, a wireless communicator 803, a processing circuitry 804, and a memory 805. The display module 801 may be a large-sized (e.g., tens of inches) LCD or organic EL so that the plurality of students can view the teaching information simultaneously. The display module 810 described above may be implemented by this display module 801. Moreover, the input part 802 may be a position input device, such as a transparent pressure-sensitive type or capacitance-type touchpad. This input part 802 may have about the same size and shape as those of the display module 801, and may be pasted on the surface of the display module 801. Therefore, the display module 801 and the input part 802 may be constituted as an integral-type touch panel.

The wireless communicator 803 may be a communicating part which enables wireless communications complying with wireless LAN standards, such as IEEE802.11a/b/g/n/ac, and may have an antenna 803a for the wireless communications. The wireless communicator 830 described above may be implemented by this wireless communicator 803.

The processing circuitry 804 may include a CPU 811 and a memory 812, and control each part of the remote display device 800. The CPU 811 may execute a computer program in the memory 812. By the CPU 811 executing a remote display program 850 which is a computer program for remote display, the remote display of the display screen by the terminal device 300 may become possible. The display data generator 820 and the updater 840 which are described above may be implemented by this processing circuitry 804. The memory 805 may be a hard disk drive, and the remote display program 850 described above may be installed therein. Moreover, the memory 805 may store teaching material data 851. The CPU 811 can read the teaching material data 851, display teaching materials on the display module 801, and display the teaching information inputted by the teacher, and presentation information given by the student(s) so as to be superimposed on the teaching materials.

Moreover the memory 805 may be provided with a user management database (user management DB) 853 which stores information on the users, i.e., the teacher and the students who take the lesson. The user management DB 853 may store user names and passwords of the teacher and the students so as to be associated with each other.

Moreover, an access point (not illustrated) of the wireless LAN may be installed in the classroom where the remote display device 800 is installed, and the remote display device 800 and each terminal device 300 may be configured to wirelessly communicate with each other through the access point.

<Operation of Remote Display System>

Below, operation of the remote display system 101 according to this embodiment is described. The remote display system 101 executes processings, such as a login, a presentation information display, and a logout.

[Login]

Figure 28:
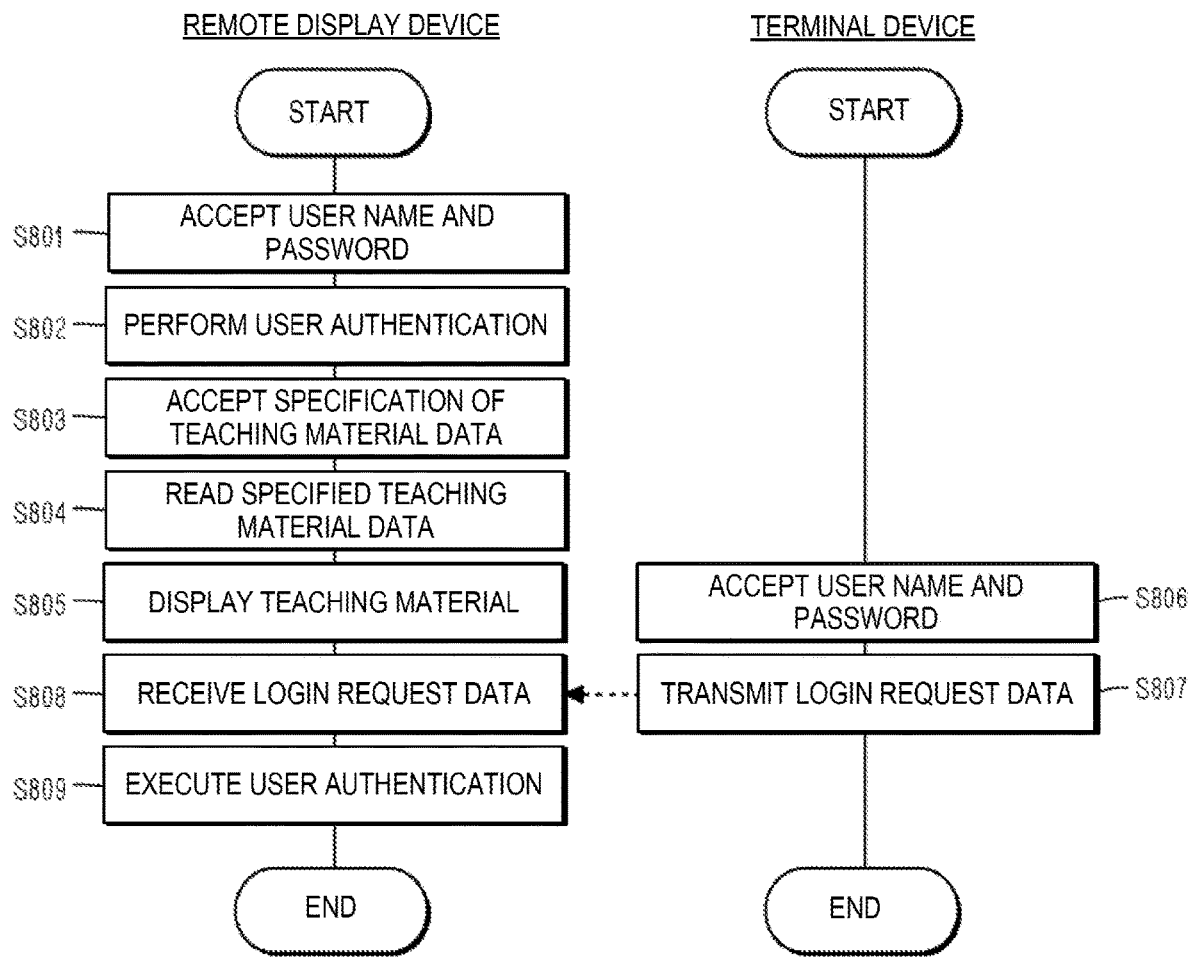
FIG. 28 is a flowchart illustrating a login procedure of the remote display system according to Embodiment 8.

First, the login is described. FIG. 28 is a flowchart illustrating a login procedure of the remote display system 101 according to this embodiment. When start the lesson, the remote display program 850 may be executed by the CPU 811. The teacher can request the login by entering his/her own user name and password into the input part 802. The CPU 811 may accept the input of the teacher's user name and password (Step S801). The CPU 811 may compare the accepted user name and password with those stored in the user management DB 853 to perform a user authentication for determining whether the user is a registered user (Step S802).

If the user authentication is successful, the teacher may operate the input part 802 to specify the teaching material data 851 to be used for the lesson. When the specification of the teaching material data 851 is received (Step S803), the CPU 811 may read the specified teaching material data 851 (Step S804), and display the teaching materials on the display module 801 (Step S805). Although not illustrated in FIG. 28, if the user authentication is failed, the CPU 811 may refuse the login, and therefore, the user becomes unable to operate the remote display device 800.

The student who uses the terminal device 300 may instruct an execution of the terminal program 350 to the terminal device 300, and the CPU 311 may execute this program. Moreover, the user may enter his/her own user name and password into the input part 302 to log in to the remote display system 101. The CPU 311 may accept the input of the user name and password (Step S806), and transmit login request data including the accepted user name and password to the remote display device 800 (Step S807). When the login request data is received (Step S808), the CPU 811 of the remote display device 800 may execute the user authentication by using the user name and password which are included in the login request data (Step S809). If the user authentication is successful, the login of the student to the remote display system 101 may be finished, and therefore, this student may become able to use the remote display system 101. As described above, the login may be finished.

[Presentation Information Display]

Figure 29:
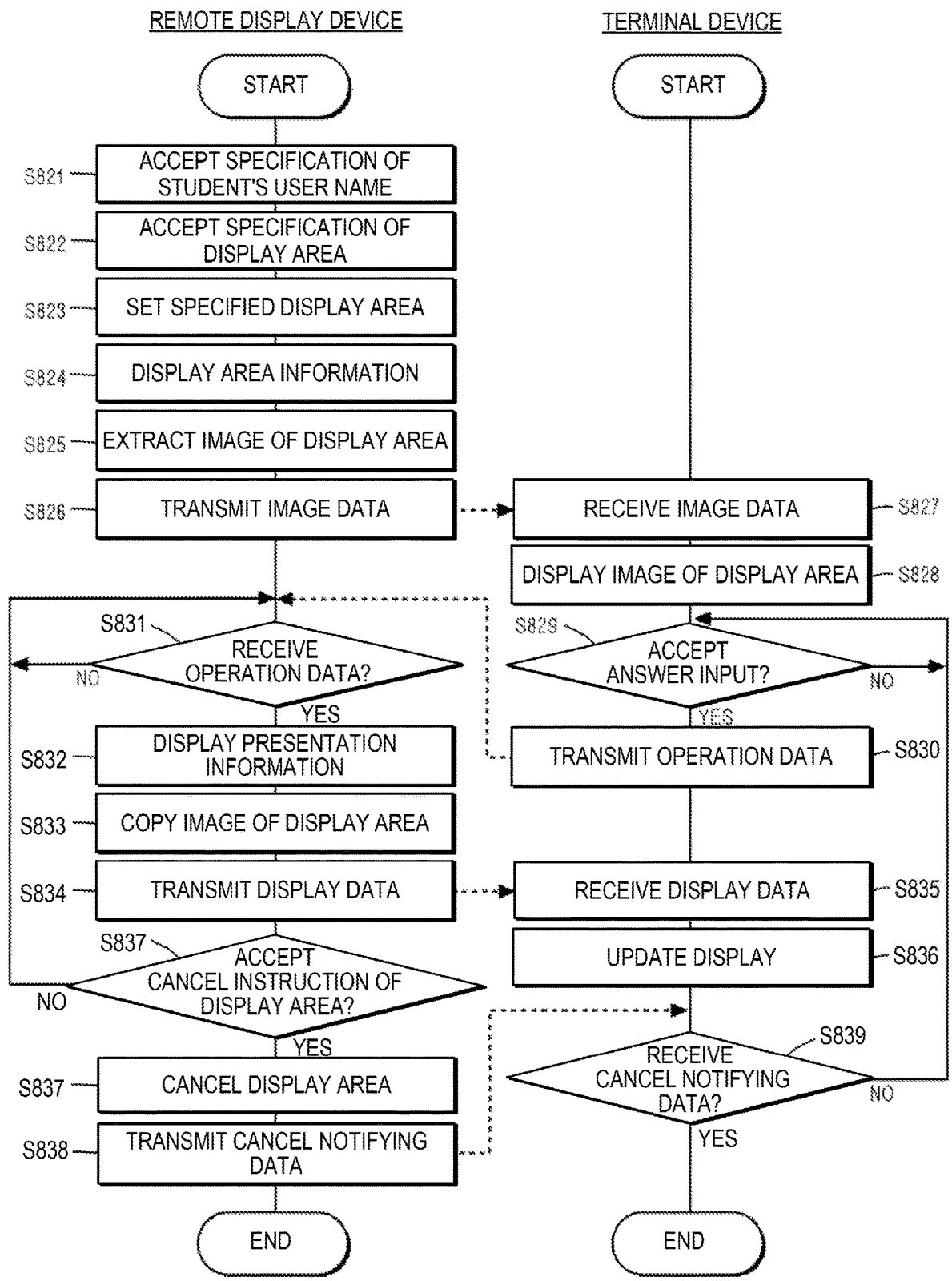
FIG. 29 is a flowchart illustrating a presentation information display procedure of the remote display system according to Embodiment 8.

Next, a presentation information display of the remote display system 101 is described. FIG. 29 is a flowchart illustrating a presentation information display procedure of the remote display system 101 according to this embodiment. The teacher may present a question to the students by displaying teaching materials including the question on the remote display device 800. The teacher can make the students present an answer to the question by using the remote display system 101. In this case, the teacher may make a plurality of students present answers. The teacher may operate the input part 802 to specify the user name of the student who presents, and specify a display area in the remote display device 800 for this student. The CPU 811 of the remote display device 800 may accept the specification of the student's user name (Step S821), and accept the specification of the display area (Step S822). The specification of the user name can be performed, for example, when a specific operation is performed to the input part 802, by displaying on the display module 801 a list of the user names of the students who have logged in at that time, and giving to the input part 802 an input for selecting a user name from the list. Moreover, the specification of the display area can be inputted, as specific coordinates in the display area (e.g., upper left coordinates), by selecting a desired position in the input part 802 by a specific operation.

Figure 30:
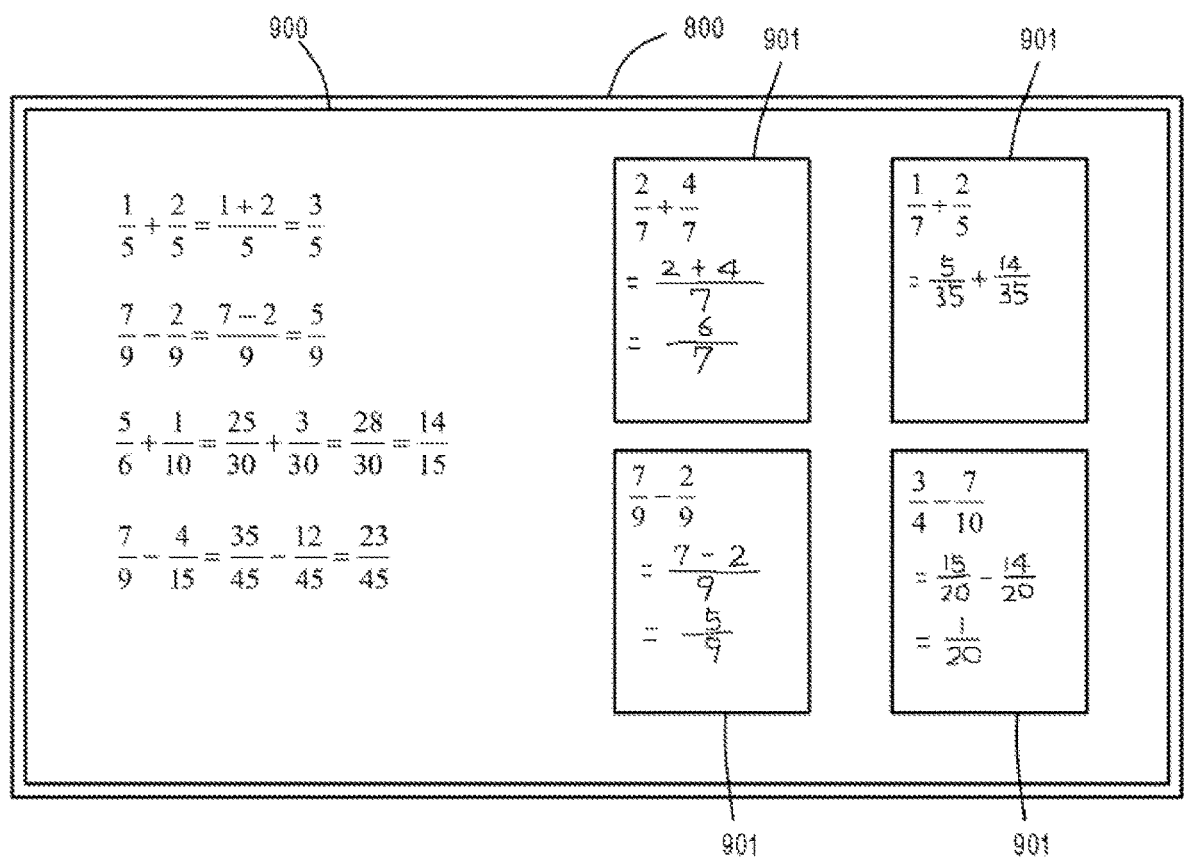
FIG. 30 is a view illustrating one example of a display screen of the remote display device according to Embodiment 8.

The CPU 811 may set the specified display area (Step S823), and display area information indicative of the display area in the display screen (hereinafter, referred to as a "blackboard screen") where the teaching materials are displayed so that the area information is superimposed on the display screen (Step S824). FIG. 30 is a view illustrating one example of the display screen of the remote display device 800. As illustrated in FIG. 30, area information 901 which is a rectangular frame may be displayed in a blackboard screen 900 so that the area information 901 is superimposed on the blackboard screen 900. Referring again to FIG. 29, the CPU 811 may copy an image in the display area from the blackboard screen to generate the display data (Step S825), and transmit the generated display data to the terminal device 300 (Step S826). The terminal device 300 may receive the display data (Step S827), and the CPU 311 may display on the display module 301 an image of a part of the blackboard screen indicated by the received display data (Step S828).

The teacher may make the specified student input the answer to the question into the terminal device 300. The student may input the answer to the question into the terminal device 300 by operating the input part 302. The CPU 311 may determine whether the input of the answer is accepted (Step S829), and if the input of the answer is not accepted (NO at Step S829), it may repeat the processing at Step S829. Moreover, if the input of the answer is accepted (YES at Step S829), the CPU 311 may transmit operation data including presentation information indicative of the accepted answer to the remote display device 800 (Step S830). The CPU 811 of the remote display device 800 may determine whether the operation data is received (Step S831), and if the operation data is not received (NO at Step S831), it may repeat the processing at Step S831. On the other hand, if the operation data is received (YES at Step S831), the CPU 811 may display the presentation information included in the received operation data so that the presentation information is superimposed on the blackboard screen (Step S832). In this case, the CPU 811 may copy an image of the updated display area to generate the display data (Step S833), and transmit the generated display data to the terminal device 300 (Step S834). The terminal device 300 receives the display data (Step S835), and the CPU 311 displays on the display module 301 an image of the updated display area indicated by the received display data (Step S836). FIG. 30 illustrates one example where the presentation information by four students are displayed. In the blackboard screen, the area information 901 indicative of four display areas may be displayed, and the presentation information indicative of presentation contents of a student may be displayed on each display area. Therefore, other students who participate in the lesson can share the student's presentation information. Moreover, the plurality of students can hold presentations simultaneously.

When ending the presentation by a student, the teacher can instruct a cancel of the set display area by performing a specific operation in the input part 802. The CPU 811 may determine whether the instruction for canceling the display area is accepted (Step S837), and if the instruction of the cancel is not accepted (NO at Step S837), the CPU 811 may return the processing to Step S831. On the other hand, if the instruction for canceling the display area is accepted (YES at Step S837), the CPU 811 may cancel the display area (Step S837), and transmit cancel notifying data which notifies the cancel of the display area to the terminal device 300 (Step S838). The CPU 311 of the terminal device 300 may determine whether the cancel notifying data is received (Step S839), and if the cancel notifying data is not received (NO at Step S839), it may return the processing to Step S829. On the other hand, if the cancel notifying data is received (YES at Step S839), the CPU 311 may end the processing. As described above, the presentation information display may be finished.

[Logout]

Next, a logout of the remote display system 101 is described. When ending the lesson, the teacher and the students may log out from the remote display system 101. When the teacher operates the input part 802 and requests a logout, the CPU 811 may execute the logout and erase the blackboard screen from the display module 801. Moreover, when the student operates the input part 302 and requests a logout, the terminal device 300 may transmit a logout request to the remote display device 800, and the CPU 811 of the remote display device 800 may execute the logout.

Other Embodiments

In Embodiments 1 to 8 described above, although the part of the screen displayed on the remote display device 200 or 800 is set as the display area, and the image which is the copy of this display area is displayed on the terminal device 300, the present disclosure is not limited to this configuration. For example, a part of the screen displayed on the remote display device may be set as the display area, the remote display device may read an image corresponding to the image of the display area from the image data stored in the memory, and this image may be displayed on the terminal device. That is, the remote display device may generate, as the display data, the image data different from the display screen, and may transmit the display data to the terminal device. By doing so, for example, when the nautical chart is displayed on the remote display device, the data of the nautical chart at the same position as the display area which is a part of the nautical chart may be transmitted to the terminal device as the display data to display this nautical chart on the terminal device. Moreover, in this case, an image of which the resolution is different from the image displayed on the remote display device may be displayed. Moreover, the terminal device may store the image data, the remote display device sets a part of the display screen as the display area, positional information on the display area may be transmitted to the terminal device as the display data, the terminal device may read the image data at the position identified by the display data, and the image indicated by the image data may be displayed.

Moreover, in Embodiments 1 to 8 described above, although the area information indicative of the display area of the terminal device 300 is displayed on the display screen of the remote display device 200 or 800, the present disclosure is not limited to this configuration. On the display screen of the remote display device, a size-reduced screen of the display screen may be displayed superimposedly, and the position of each display area may be displayed on the size-reduced screen.

Moreover, in Embodiments 1 to 8 described above, although the communications among the users are performed by the voice call, the present disclosure is not limited to this configuration. The remote display device may be provided with a function for exchanging text between the users in real time (a so-called "chat"), and the exchanges of text may be performed among the users, instead of the voice call.

Moreover, in Embodiments 1 to 8 described above, when the user authentication in the login is failed, the user is unable to use any of the functions of the remote display system 100, but the present disclosure is not limited to this configuration. For example, when the user authentication is failed, the nautical chart and the route are displayed, but some of the functions may be disabled, such as not displaying the user name, not giving the operational authority of a route, etc.

Terminology

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controlling module, microcontrolling module, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controlling module, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow views described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface." The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated," and other such relational terms should be construed, unless otherwise noted, to include removable, moveable, fixed, adjustable, and/or releasable connections or attachments. The connections/attachments can include direct connections and/or connections having intermediate structure between the two components discussed.

Numbers preceded by a term such as "approximately," "about," and "substantially" as used herein include the recited numbers, and also represent an amount close to the stated amount that still performs a desired function or achieves a desired result. For example, the terms "approximately," "about," and "substantially" may refer to an amount that is within less than 10% of the stated amount. Features of embodiments disclosed herein are preceded by a term such as "approximately," "about," and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A remote display device, comprising:
processing circuitry configured to:
  display a display screen,
  generate a plurality of display data corresponding to mutually different display areas, each being a part of the display screen,
  transmit the plurality of display data to a plurality of terminal devices, respectively, and
  update the display screen based on operation data indicative of an operation performed by the terminal device to the display area corresponding to the display data,
wherein the processing circuitry generates the display data in which an overlap area of the display area of one terminal device overlapping with the display area of the other terminal device is not displayed.

2. The remote display device of claim 1, wherein the corresponding display areas of the plurality of display data do not overlap with each other.

3. The remote display device of claim 1, wherein the processing circuitry updates the display screen based on the operation data transmitted from one terminal device, for the overlap area of the display area of the one terminal device overlapping with the display area of the other terminal device, and disables the operation data transmitted from the other terminal device.

4. The remote display device of claim 3, wherein the processing circuitry performs processing for the overlap area based on the operation data transmitted from the terminal device that first transmits the operation data.

5. The remote display device of claim 3, wherein in case that the operation data for the overlap area transmitted from the plurality of terminal devices compete, the processing circuitry determines authority levels of the operation given to users who use the respective terminal device that transmitted the operation data, and updates the display screen based on the operation data transmitted from one of the terminal device operated by one of the users selected according to the authority level.

6. The remote display device of claim 1, wherein in case that the operation data is received from the terminal device, the processing circuitry determines operational authority of the user who uses the terminal device, updates the display screen based on the operation data transmitted from one terminal device used by the user who has the authority, and disables the operation data transmitted from the other terminal device used by the user who does not have the authority.

7. The remote display device of claim 1, wherein the processing circuitry displays information on the plurality of users who use the respective terminal devices on the display screen.

8. The remote display device of claim 7, wherein the processing circuitry transmits user display data including the information on the plurality of users to each of the plurality of terminal devices.

9. The remote display device of claim 7, wherein in case that the operation data indicative of an operation related to an addition or a correction of a matter displayed on the display screen is received from one of the terminal devices, the processing circuitry adds or corrects the matter in the display screen based on the operation data, and displays the information on the user who uses the one terminal device.

10. The remote display device of claim 1, wherein the display data is image data obtained by copying a part of the display screen.

11. The remote display device of claim 10, wherein in case that the operation data that satisfies a specific exception condition is received, the processing circuitry generates the display data for displaying an image different from the display screen, instead of the data obtained by copying the part of display screen, and
  wherein the processing circuitry transmits the display data to the terminal device that is a transmission source of the transmitting data.

12. The remote display device of claim 11, wherein the exception condition is a request for moving the display area to the outside of the display screen, and
  wherein the processing circuitry generates the display data for displaying the outside of the display screen.

13. The remote display device of claim 12, wherein the processing circuitry generates the display data for displaying an image to which boundary information indicative of a boundary between the display screen and the outside thereof is added.

14. The remote display device of claim 11, wherein the exception condition is a request for magnifying the indication in the display area, and wherein the processing circuitry generates the display data for displaying an image in the display area with a higher resolution than that of the display screen.

15. The remote display device of claim 1, wherein the processing circuitry displays, in the display screen, area information indicative of a position in the display screen of the display area of each of the plurality of terminal devices so that the area information is superimposed on the display screen.

16. The remote display device of claim 1, wherein the display screen includes a nautical chart, and
wherein in case that the operation data indicative of an operation of setting a route is received, the processing circuitry updates the display screen to a display screen in which the route is set based on the operation data.

17. The remote display device of claim 1, wherein the display screen includes teaching material information indicative of teaching materials, and
wherein in case that the operation data including presentation information related to the teaching material information to be presented by a participant is received, the processing circuitry updates the display screen to a display screen including the presentation information.

18. A remote display system, comprising:
a remote display device, including a processing circuitry configured to:
    display a display screen,
    generate a plurality of display data corresponding to mutually different display areas, each being a part of the display screen,
    transmit the plurality of display data to a plurality of terminal devices, respectively; and
    update the display screen based on operation data indicative of an operation performed by the terminal device to the display area corresponding to the display data; and the plurality of terminal devices, each configured, in case that the display data transmitted from the remote display device is received, to display the display area corresponding to the display data, and in case that the operation performed to the display area is received, to transmit the operation data indicative of the operation,
wherein the processing circuitry generates the display data in which an overlap area of the display area of one terminal device overlapping with the display area of the other terminal device is not displayed.

19. A remote display method, comprising:
generating, by a remote display device, a plurality of display data corresponding to mutually different display area, each being a part of a display screen displayed on the remote display device;

transmitting, by the remote display device, the plurality of generated display data to a plurality of terminal devices, respectively;

displaying, by the terminal device, the display area corresponding to the display data, when the display data transmitted from the remote display device is received;

transmitting, by the terminal device, when an operation for the display area from a user is received, operation data indicative of the operation; and updating, by the remote display device, the display screen based on the operation data, when the operation data is received from the terminal device, wherein the display data is generated in which an overlap area of the display area of one terminal device overlapping with the display area of the other terminal device is not displayed.

* * * * *